United States Patent
Luo et al.

(10) Patent No.: US 10,432,290 B2
(45) Date of Patent: Oct. 1, 2019

(54) ANALOG BEAMFORMING DEVICES

(71) Applicant: Huawei Technologies Co., Ltd., Shenzhen (CN)

(72) Inventors: Jian Luo, Munich (DE); Reiner Thomae, Ilmenau (DE); Diego Dupleich, Ilmenau (DE); Matthias Röding, Ilmenau (DE); Stephan Haefner, Ilmenau (DE); Robert Mueller, Ilmenau (DE); Christian Schneider, Ilmenau (DE); Dominik Schulz, Ilmenau (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/889,723

(22) Filed: Feb. 6, 2018

(65) Prior Publication Data

US 2018/0183509 A1    Jun. 28, 2018

Related U.S. Application Data

(63) Continuation of application No. PCT/EP2015/068276, filed on Aug. 7, 2015.

(51) Int. Cl.
*H04B 7/06* (2006.01)
*H04B 7/00* (2006.01)
(Continued)

(52) U.S. Cl.
CPC .......... *H04B 7/0671* (2013.01); *H04B 7/002* (2013.01); *H04B 7/01* (2013.01); *H04B 7/0617* (2013.01);
(Continued)

(58) Field of Classification Search
CPC .................................................. H04B 7/0671
(Continued)

(56) References Cited

U.S. PATENT DOCUMENTS

| 5,936,961 | A * | 8/1999 | Chiodini | H04B 7/01 |
| | | | | 370/441 |
| 6,169,771 | B1 * | 1/2001 | Shou | H03H 17/0254 |
| | | | | 370/335 |

(Continued)

FOREIGN PATENT DOCUMENTS

| EP | 2022187 B1 | 3/2011 |
| WO | 2009030617 A1 | 3/2009 |
| WO | 2013119039 A1 | 8/2013 |

OTHER PUBLICATIONS

Zhang et al., "Multiple Doppler Shifts Compensation and ICI Elimination by Beamforming in High-Mobility OFDM Systems," 2011 6th International ICST Conference on Communications and Networking in China (CHINACOM), pp. 170-175, Institute of Electrical and Electronics Engineers, New York, New York (2011).

(Continued)

*Primary Examiner* — Lihong Yu
(74) *Attorney, Agent, or Firm* — Leydig, Voit & Mayer, Ltd.

(57) ABSTRACT

An analog beamforming transmitter includes: a plurality of beamforming transmission circuits coupled in parallel between a signal input and an array of antenna ports, wherein the signal input is configured to receive an analog complex-valued communication signal having an in-phase and a quadrature component, wherein each antenna port of the array of antenna ports is configured to provide a dual-polarized antenna signal having a first polarization component and a second polarization component, wherein each beamforming transmission circuit is coupled between the signal input and a respective antenna port of the array of (Continued)

antenna ports, wherein each beamforming transmission circuit comprises a first coefficient input for receiving a first analog complex-valued beamforming coefficient a set of first analog complex-valued beamforming coefficients and a second coefficient input for receiving a second analog complex-valued beamforming coefficient of a set of second analog complex-valued beamforming coefficients.

22 Claims, 19 Drawing Sheets

(51) Int. Cl.
  *H04B 7/01* (2006.01)
  *H04B 7/08* (2006.01)
  *H04B 7/10* (2017.01)
(52) U.S. Cl.
  CPC .......... *H04B 7/0691* (2013.01); *H04B 7/084* (2013.01); *H04B 7/086* (2013.01); *H04B 7/0874* (2013.01); *H04B 7/10* (2013.01)
(58) Field of Classification Search
  USPC ........................................................ 375/267
  See application file for complete search history.

(56) References Cited

U.S. PATENT DOCUMENTS

| | | | | |
|---|---|---|---|---|
| 7,990,298 | B1* | 8/2011 | Friedmann | H03M 1/0614 341/118 |
| 8,522,052 | B1 | 8/2013 | Lesea | |
| 8,605,703 | B2 | 12/2013 | Pratt et al. | |
| 2002/0003444 | A1* | 1/2002 | Sasaki | H03B 27/00 327/244 |
| 2004/0203395 | A1 | 10/2004 | Chizhik et al. | |
| 2004/0213196 | A1 | 10/2004 | Deng et al. | |
| 2006/0097940 | A1* | 5/2006 | Shimawaki | H01Q 3/26 343/761 |
| 2007/0149157 | A1 | 6/2007 | Hwang et al. | |
| 2009/0046003 | A1 | 2/2009 | Tung et al. | |
| 2012/0212372 | A1 | 8/2012 | Petersson et al. | |
| 2013/0115886 | A1* | 5/2013 | Khan | H01Q 3/26 455/42 |
| 2013/0301454 | A1 | 11/2013 | Seol et al. | |

OTHER PUBLICATIONS

Friis, "A Note on a Simple Transmission Formula," Proceedings of the I.R.E. and Waves and Electrons, pp. 254-256 (May 1946).

Berraki et al., "Polarimetric Filtering for an Enhanced Multi-User 60GHz WPAN System," IEEE Wireless Communications and Networking Conference (WCNC), pp. 347-351, Institute of Electrical and Electronics Engineers, New York, New York (2014).

Fouda et al., "Time-reversal techniques for MISO and MMO wireless communication systems," Radio Science, vol. 47, RS0P02, doi: 10.1029/2012RS005013, pp. 1-15 (2012).

Sato et al., "Measurements of Reflection and Transmission Characteristics of Interior Structures of Office Building in the 60-GHz Band," IEEE Transactions on Antennas and Propagation, vol. 45, No. 12, pp. 1783-1792, Institute of Electrical and Electronics Engineers, New York, New York (Dec. 1997).

Plattner et al., "Indoor and Outdoor Propagation Measurements at 5 and 60 GHz for Radio LAN Application," IEEE MTT-S Digest, vol. 2, pp. 853-856, Institute of Electrical and Electronics Engineers, New York, New York (Jun. 1993).

Ariza et al., "60 GHz Ultrawideband Polarimetric MIMO Sensing for Wireless Multi-Gigabit and Radar," IEEE Transactions on Antennas and Propagation, vol. 61, No. 4, pp. 1631-1641, Institute of Electrical and Electronics Engineers, New York, New York (Apr. 2013).

Dupleich et al., "Directional characterization of the 60 GHz indoor-office channel," 2014 XXXIth URSI General Assembly and Scientific Symposium (URSI GASS), pp. 1-4, Institute of Electrical and Electronics Engineers, New York, New York (Aug. 16-23, 2014).

Degli-Esposti et al., Ray-Tracing-Based mm-Wave Beamforming Assessment, IEEE Access, vol. 2, pp. 1314-1325, Institute of Electrical and Electronics Engineers, New York, New York (2014).

Roh et al., "Millimeter-Wave Beamforming as an Enabling Technology for 5G Cellular Communications: Theoretical Feasibility and Prototype Results," IEEE Communications Magazine, vol. 52, Issue 2, pp. 106-113, Institute of Electrical and Electronics Engineers, New York, New York (Feb. 2014).

Kim et al., "Tens of Gbps Support with mmWave Beamforming Systems for Next Generation Communications," 2013 IEEE Global Communications Conference (GLOBECOM), pp. 3685-3690, Institute of Electrical and Electronics Engineers, New York, New York (2013).

Alkhateeb et al., "Channel Estimation and Hybrid Precoding for Milimeter Wave Cellular Systems," IEEE Journal of Selected Topics in Signal Processing, vol. 8, No. 5, pp. 831-846, Institute of Electrical and Electronics Engineers, New York, New York (Oct. 2014).

* cited by examiner

ANALOG BEAMFORMING DEVICES

CROSS-REFERENCE TO RELATED APPLICATIONS

This application is a continuation of International Application No. PCT/EP2015/068276, filed on Aug. 7, 2015, the disclosure of which is hereby incorporated by reference in its entirety.

TECHNICAL FIELD

The present disclosure relates to an analog beamforming transmitter and an analog beamforming receiver. The disclosure further relates to an analog polarization adjustment transmitter, an analog polarization adjustment receiver, an analog Doppler shift compensation transmitter, an analog Doppler shift compensation receiver, an analog Delay compensation transmitter, an analog Delay compensation receiver and an antenna arrangement including a signal distribution unit. In particular, the present disclosure relates to beam-forming technology in wireless communication systems and to a wide-band polarimetric beam-forming approach with space-time-processing.

BACKGROUND

Propagation characteristics at mm-waves differ from the lower bands typically used in communication systems. The main characteristic is its "quasi-optical" behaviour due to the small wavelength size. Therefore, rough surface scattering effects are enhanced, reflections become more specular-like, and diffraction effects are very small. Furthermore, path loss is increased due to the high free-space attenuation. Penetration loss through building materials is significantly higher than at lower bands, limiting the indoor communication range mostly to intra-room applications. Due to such kind of penetration loss, non-line-of-sight (NLOS) transmission becomes more challenging than in lower bands.

The mm-wave channel is usually considered as "deterministic" since the fading effects introduced by the superposition of different paths are highly reduced in comparison to those in lower frequency bands. One illustration is that single paths can be well identified and isolated with different delays. Furthermore, due to its deterministic characteristic, each different path bears a clearly defined polarization. The polarization changes with the interaction of the waves with the environment. In particular, due to the small size of the wavelength, the number of objects which effect the propagation path by interacting and changing the polarization properties is increased. These changes can be the rotation of the linear polarization angle, for example by the cancellation of a determined polarization after the interaction with structures that only reflect one of the components of the polarization. Another consequence of the deterministic behaviour of the channel is that the environment acts as a spatial filter resulting in different parameters (e.g. Doppler and phase shift, delay, polarization) for every single path.

In order to counteract the high path-loss, mm-wave communication systems are expected to use high gain antennas, e.g. antenna arrays that can concentrate the energy in a desired direction. The relatively small size of mm-wave antennas allows the adoption of compact, very high-order MIMO arrays which enable narrow-beam beam-forming schemes. This provides a very high resolution in the directional domain.

Due to the high free-space propagation loss, wireless transmission in mm-wave frequency will mostly rely on beam forming. The key question is how to do beamforming to exploit the special characteristics of mm-wave channel and to maximize the receive signal quality. One of the main special characteristics of mm-wave channel propagation is its highly directional and spatial selectivity. Usually, there are only a limited number of propagation paths between the transmitter (TX) and the receiver (RX), including the Line-of-Sight (LOS) path and Non-Line-of-Sight (NLOS) paths. Due to the high directional selectivity of the mm-wave channel and the expected large bandwidth of the mm-wave system, these paths can be well resolved. For signal transmission, one can point the beams in direction of these paths.

SUMMARY

It is the object of the invention to provide a technique for improved beamforming, in particular for wireless transmission in the mm-wave channel.

This object is achieved by the features of the independent claims. Further implementation forms are apparent from the dependent claims, the description and the figures.

The basic concept described in this disclosure is directed to a new beam forming technique in mm-wave frequency range. The disclosed beam forming technique can maximize the received signal quality by exploiting the signal energy in different propagation paths and at the same time, can minimize the interference by making use of the different propagation channels between the base station and the different users. Hereinafter, a propagation channel may include a certain number of propagation paths.

The disclosure describes a solution for making the best out of the multiple propagation paths and increasing overall received power to facilitate transmission even in NLOS communication. The key solution is to have a coherent sum of signals from different propagation paths in terms of polarization, delay and Doppler shift. Especially, to allow coherent summation in terms of polarization, the signal loss due to interaction with scatters which change polarization characteristics as well as the polarization mismatch between TX and RX are considered. Due to the large number of antennas involved, fully digital implementation of such solution may not be efficient. Therefore, analog-processing based implementation is applied.

The disclosed beam-forming technique for wideband mm-wave communications with the capability to exploit the mm-wave channel propagation characteristics is based on multi-beamforming and power adjustment of TX signal in different beams. Multi-beam-forming includes spatial steering of multiple beams to provide robustness against shadowing and dynamic of the paths and to enhance the received signal and/or cancelling undesired signals such as interference. Power adjustment of TX signal in different beams considers a total power constraint for optimization of the distribution of the total EIRP in different directions (beams) to maximize the received signal power.

The disclosed beam-forming technique applies selection of beams/propagation paths based on the change of polarization in each path (e.g. rotation of polarization or attenuation of the signal of a polarization) and propagation loss of the paths, etc. The change of polarization can e.g. be caused by reflectors, which are objects that reflect the transmitted electro-magnetic wave to the receiver. In downlink direction, the disclosed beam-forming technique applies synthesizing the polarization angle of each beam by weighting the signals fed to orthogonally polarized antennas. The synthesized polarization of each beam is chosen to increase (or cancel) the reflection power and/or to match the receiver polarization. The disclosed beam-forming technique applies pre-delay (time reversal) processing of each beam to cancel the delay difference of the different chosen propagation paths and to have a coherent sum of signals from the multiple propagation paths at the RX. In uplink direction, the disclosed beam-forming technique follows similar principle but with the processing at BS receiver. The disclosed beam-forming technique applies optional compensation of Doppler shift of each beam by modulating the signal for each beam individually. The disclosed beam-forming technique applies analog implementation architectures based on mixed signal technology to reduce number of digital paths and power consumption: Several analog baseband circuit architectures for beamforming and Doppler compensation are described in this disclosure.

The implementation of this beamformer at the Base Station (BS) side enables lower complexity in the mobile equipment.

In order to describe the invention in detail, the following terms, abbreviations and notations will be used:
TX: transmitter
RX: receiver
BS: base station
UE: user equipment or mobile station
MRC: maximum ratio combining
DAC: digital-to-analog converter
ADC: analog-to-digital converter
MIMO: multiple input multiple output
IF: intermediate frequency
I: in-phase component
Q: quadrature component
RF: radio frequency
LOS: line of sight
NLOS: non line of sight
AoD: angle of departure
AoA: angle of arrival
V: vertical polarized
H: horizontal polarized
SINR: signal-to-interference plus noise ratio
ISI: inter-symbol interference In the following, systems, devices and methods using beamforming and TX/RX antenna arrays that may be applied in MIMO systems are described.

Beamforming or spatial filtering is a signal processing technique used for antenna arrays to realize directional signal transmission or reception. Elements in a phased antenna array are combined in such a way that signals at particular angles experience constructive interference while others experience destructive interference. Beamforming can be used for both the transmitting and receiving ends in order to achieve spatial selectivity. A beamformer controls the phase and relative amplitude of the transmit signal at each transmit antenna, in order to create a pattern of constructive and destructive interference in the wave-front. When receiving, signals from different antennas is combined in a way to preferentially observe the expected pattern.

An antenna array is a set of individual antennas used for transmitting and/or receiving radio waves which are arranged together in such a way that their individual currents are in a specified amplitude and phase relationship. This allows the array acting as a single antenna, resulting in improved directional characteristics, i.e. higher antenna gain, than would be obtained from the individual elements.

Multiple-input and multiple-output (MIMO) is a technique for increasing the capacity of a radio link using multiple transmit and receive antennas to exploit multiple propagation channels between different TX and RX antennas.

In the following, systems, devices and methods using single-polarized antenna signals and dual-polarized antenna signals are described. A dual-polarized antenna signal is a signal consisting of two polarization components that are fed to or received from the two antenna elements of a dual polarized antenna. A single-polarized antenna signal or simply referred to as an antenna signal is a signal consisting of one polarization component that is fed to or received from a single polarized antenna or simply referred to as an antenna.

Systems, devices and methods according to the disclosure may use Gilbert cells. A Gilbert cell is an elaborated cascode circuit used as an analog multiplier and frequency mixer. The Gilbert cell includes two differential amplifier stages that may be formed by emitter-coupled transistor pairs whose outputs are connected (currents summed) with opposite phases. The emitter junctions of these amplifier stages are fed by the collectors of a third differential pair. The output currents of this third differential pair become emitter currents for the differential amplifiers.

According to a first aspect, the invention relates to an analog beamforming transmitter, comprising: a plurality of beamforming transmission circuits coupled in parallel between a signal input and an array of antenna ports, wherein the signal input is configured to receive an analog complex-valued communication signal having an in-phase and a quadrature component, wherein each antenna port of the array of antenna ports is configured to provide a dual-polarized antenna signal having a first polarization component, e.g. a vertical polarization component, and a second polarization component, e.g. a horizontal polarization component, wherein each beamforming transmission circuit is coupled between the signal input and a respective antenna port of the array of antenna ports, wherein each beamforming transmission circuit comprises a first coefficient input for receiving a first analog complex-valued beamforming coefficient of a set of first analog complex-valued beamforming coefficients and a second coefficient input for receiving a second analog complex-valued beamforming coefficient of a set of second analog complex-valued beamforming coefficients, and wherein each beamforming transmission circuit comprises: a first analog complex-valued multiplication circuit configured to multiply the analog complex-valued communication signal with the first analog complex-valued beamforming coefficient to provide the first polarization component of the dual-polarized antenna signal at the respective antenna port of the array of antenna ports; and a second analog complex-valued multiplication circuit configured to multiply the analog complex-valued communication signal with the second analog complex-valued beamforming coefficient to provide the second polarization component of the dual-polarized antenna signal at the respective antenna port of the array of antenna ports.

Such an analog beamforming transmitter provides the advantage that less high speed DACs are needed. Instead, different kinds of DACs can be applied for providing the analog complex-valued communication signal at the signal input and for providing the analog complex-valued beamforming coefficients. The DAC converter for providing the analog complex-valued communication signal may be a high-speed DAC while the DACs for providing the analog complex-valued beamforming coefficients may be low-speed DACs since the change of the coefficients is slower compared to the communication signal. This reduces a total complexity of the beamforming transmitter.

In a first possible implementation form of the analog beamforming transmitter according to the first aspect, the analog beamforming transmitter comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients.

This provides the advantage that the analog beamforming transmitter can provide an antenna signal in which the Doppler shift of each propagation path can be compensated by adequate modulation of the beamforming coefficients.

In a second possible implementation form of the analog beamforming transmitter according to the first implementation form of the first aspect, the modulation circuitry is configured to modulate the first analog complex-valued beamforming coefficient and the second analog complex-valued beamforming coefficient to a frequency that has the negated value of the Doppler shift corresponding to the concerned beam.

This provides the advantage that the analog beamforming transmitter can provide an antenna signal in which the Doppler shift of each propagation path is already removed.

In a third possible implementation form of the analog beamforming transmitter according to the first aspect, each beamforming transmission circuit comprises: a mixer configured to mix the analog complex-valued communication signal with a Doppler shift compensation frequency to provide a Doppler shift compensated analog complex-valued communication signal to the first and second analog complex-valued multiplication circuits.

This provides the advantage that the analog beamforming transmitter can provide an antenna signal in which the Doppler shift of each propagation path can be compensated by adequate mixing of the analog communication signal.

In a fourth possible implementation form of the analog beamforming transmitter according to the first aspect as such or according to any of the preceding implementation forms of the first aspect, each beamforming transmission circuit comprises: a delay line configured to delay the analog complex-valued communication signal with a time delay to provide a delay compensated analog complex-valued communication signal to the first and second analog complex-valued multiplication circuits.

This provides the advantage that the analog beamforming transmitter can provide an antenna signal in which the delay of each propagation path is already compensated.

In a fifth possible implementation form of the analog beamforming transmitter according to the first aspect as such or according to any of the preceding implementation forms of the first aspect, the first and second analog complex-valued multiplication circuits comprise at least one Gilbert cell.

This provides the advantage, that complex-valued multiplication can be efficiently performed by using Gilbert cells.

In a sixth possible implementation form of the analog beamforming transmitter according to the fifth implementation form of the first aspect, the Gilbert cell is a complex multiplication Gilbert cell that performs complex valued multiplication operation.

This provides the advantage, that complex-valued multiplication can be performed by using Gilbert cells which may be efficiently implemented by three differential amplifier stages, for example.

In a seventh possible implementation form of the analog beamforming transmitter according to the first aspect as such or according to any of the preceding implementation forms of the first aspect, the first coefficient input and the second coefficient input are coupled to a digital-to-analog converter or a shift-register circuit or a further circuitry that conveys digital coefficients to the first and second coefficient inputs for providing the first and second analog complex-valued beamforming coefficients that are computed in digital baseband processing.

This provides the advantage that the DAC converters for providing the beamforming coefficients can be independently implemented, e.g. by different clock signals, from the DAC converter for providing the communication signals.

In an eighth possible implementation form of the analog beamforming transmitter according to the first aspect as such or according to any of the preceding implementation forms of the first aspect, the analog beamforming transmitter comprises a signal combiner configured to combine the first polarization component of the dual-polarized antenna signal and a first polarization component of the dual-polarized antenna signal provided by a further analog beamforming transmitter to provide a combined first polarization component of the dual-polarized antenna signal at the respective antenna port of the array of antenna ports.

This provides the advantage that by using such combination of polarization components from different beamforming transmitters, a large antenna system can be realized that provides the capability of forming multiple beams.

According to a second aspect, the invention relates to an analog beamforming receiver, comprising: a plurality of beamforming reception circuits connected in parallel between an array of antenna ports and a signal output, wherein each antenna port of the array of antenna ports is configured to receive a dual-polarized antenna signal having a first polarization component and a second polarization component, wherein the signal output is configured to provide an analog complex-valued communication signal having an in-phase and a quadrature component, wherein each beamforming reception circuit is connected between a respective antenna port of the array of antenna ports and the signal output, wherein each beamforming reception circuit comprises a first coefficient input for receiving a first analog complex-valued beamforming coefficient of a set of first analog complex-valued beamforming coefficients and a second coefficient input for receiving a second analog complex-valued beamforming coefficient of a set of second analog complex-valued beamforming coefficients, and wherein each beamforming reception circuit comprises: a first analog complex-valued multiplication circuit configured to multiply the first polarization component of the dual polarized antenna signal at the respective antenna port of the array of antenna ports with the first analog complex-valued beamforming coefficient to provide a contribution to the analog complex-valued communication signal at the signal output; and a second analog complex-valued multiplication circuit configured to multiply the second polarization component of the dual polarized antenna signal at the respective antenna port of the array of antenna ports with the second analog complex-valued beamforming coefficient to provide a contribution to the analog complex-valued communication signal at the signal output.

Such an analog beamforming receiver provides the advantage that less ADCs are required that are used for converting the analog complex-valued communication signal to digital domain. For providing the analog complex-valued beamforming coefficients, DACs are used. The ADC converter for converting the analog complex-valued communication signal to digital domain may be a high-speed ADC while the DACs for providing the analog complex-valued beamforming coefficients may be low-speed DACs since the change of the coefficients is slower compared to the communication signal. This reduces a total complexity of the beamforming receiver.

In a first possible implementation form of the analog beamforming receiver according to the second aspect, the analog beamforming receiver comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients.

This provides the advantage that the analog beamforming receiver can receive an antenna signal in which the Doppler shift of each propagation path can be compensated by adequate modulation of the beamforming coefficients.

In a second possible implementation form of the analog beamforming receiver according to the first implementation form of the second aspect, the modulation circuitry is configured to modulate the first analog complex-valued beamforming coefficient and the second analog complex-valued beamforming coefficient to a frequency that has the negated value of the Doppler shift corresponding to the concerned beam.

This provides the advantage that the analog beamforming receiver can provide a communication signal in which the Doppler shift of each propagation path is removed.

In a third possible implementation form of the analog beamforming receiver according to the second aspect as such or according to any of the preceding implementation forms of the second aspect, each beamforming reception circuit comprises: a mixer configured to mix the contributions to the analog complex-valued communication signal provided by the first and second analog multiplication circuits with a Doppler shift compensation frequency to provide a Doppler shift compensated contribution to the analog complex-valued communication signal at the signal output.

This provides the advantage that the analog beamforming receiver can provide an analog communication signal in which the Doppler shift of each propagation path can be compensated by adequate mixing of the analog communication signal.

In a fourth possible implementation form of the analog beamforming receiver according to the second aspect as such or according to any of the preceding implementation forms of the second aspect, each beamforming reception circuit comprises: a delay line configured to delay the contribution to the analog complex-valued communication signal at the signal output with a time delay to provide a delay compensated contribution to the analog complex-valued communication signal at the signal output.

This provides the advantage, that the analog beamforming receiver can provide a communication signal in which a delay of a receive channel is already compensated.

In a fifth possible implementation form of the analog beamforming receiver according to the second aspect as such or according to any of the preceding implementation forms of the second aspect, the first and second analog complex-valued multiplication circuits comprise at least one Gilbert cell.

This provides the advantage, that complex-valued multiplication can be efficiently performed by using Gilbert cells.

In a sixth possible implementation form of the analog beamforming receiver according to the fifth implementation form of the second aspect, the Gilbert cell is a complex multiplication Gilbert cell that performs complex valued multiplication operation.

This provides the advantage, that complex-valued multiplication can be performed by using Gilbert cells which may be efficiently implemented by three differential amplifier stages, for example.

In a seventh possible implementation form of the analog beamforming receiver according to the second aspect as such or according to any of the preceding implementation forms of the second aspect, the first coefficient input and the second coefficient input are coupled to a digital-to-analog converter or a shift-register circuit providing the first and second analog complex-valued beamforming coefficients that are computed in digital baseband processing.

This provides the advantage that the DAC converters for providing the beamforming coefficients can be independently implemented, e.g. by different clock signals, from the ADC converter for providing the communication signal.

In an eighth possible implementation form of the analog beamforming receiver according to the seventh implementation form of the second aspect, the signal output is coupled to an analog-to-digital converter to provide a digital complex-valued communication signal, wherein a sampling rate of the analog-to-digital converter is greater than a sampling rate of the digital-to-analog converter that is used for converting coefficients.

This provides the advantage that such a beamforming receiver can save power and/or circuit space when the sampling rate of the digital-to-analog converter that is used for converting the coefficients can be reduced compared to sampling rate of the ADC that is used for providing the communication signal.

In a ninth possible implementation form of the analog beamforming receiver according to the second aspect as such or according to any of the preceding implementation forms of the second aspect, the analog beamforming receiver comprises a signal combiner configured to combine contributions from different antennas for forming a received beam. This is also referred to as "weighted sum principle".

In a tenth possible implementation form of the analog beamforming receiver according to the second aspect as such or according to any of the preceding implementation forms of the second aspect, the analog beamforming receiver comprises: an adder configured to add the contributions to the analog complex-valued communication signal provided by the first and second analog complex-valued multiplication circuits.

This provides the advantage that the adder can sum both polarization components and provide a communication signal dependent on both polarizations, i.e. to perform polarization filtering on the communication signal. Thus, the communication channel can be efficiently exploited.

According to a third aspect, the invention relates to an analog polarization adjustment transmitter, comprising: a plurality of polarization adjustment transmission circuits coupled in parallel between a signal input and an array of antenna ports, wherein the signal input is configured to receive an analog complex-valued communication signal having an in-phase and a quadrature component, wherein each antenna port of the array of antenna ports is configured to provide a dual-polarized antenna signal having a first polarization component and a second polarization component, wherein each polarization adjustment transmission circuit is coupled between the signal input and a respective antenna port of the array of antenna ports, wherein each polarization adjustment transmission circuit comprises a first coefficient input for receiving a first analog real-valued polarization adjustment coefficient of a set of first analog real-valued polarization adjustment coefficients and a second coefficient input for receiving a second analog real-valued polarization adjustment coefficient of a set of second analog real-valued polarization adjustment coefficients, wherein each polarization adjustment transmission circuit comprises: a first analog multiplication circuit configured to multiply the analog complex-valued communication signal with the first analog real-valued polarization adjustment coefficient to provide the first polarization component of the dual-polarized antenna signal at the respective antenna port of the array of antenna ports; and a second analog multiplication circuit configured to multiply the analog complex-valued communication signal with the second analog real-valued polarization adjustment coefficient to provide the second polarization component of the dual-polarized antenna signal at the respective antenna port of the array of antenna ports.

In a first possible implementation form of the analog polarization adjustment transmitter according to the third aspect, each polarization adjustment transmission circuit further comprises a third coefficient input for receiving an analog complex-valued beamforming coefficient of a set of analog complex-valued beamforming coefficients, and each polarization adjustment transmission circuit further comprises: an analog complex-valued multiplication circuit coupled between the signal input and a respective one of the first and second analog multiplication circuits, wherein the analog complex-valued multiplication circuit is configured to multiply the analog complex-valued communication signal with the analog complex-valued beamforming coefficient to provide a beamformed analog complex-valued communication signal to the first and second analog multiplication circuits.

In a second possible implementation form of the analog polarization adjustment transmitter according to the first implementation form of the third aspect, the analog polarization adjustment transmitter comprises: a modulation circuitry configured to modulate the analog complex-valued beamforming coefficient based on a Doppler shift corresponding to a beam formed by the analog complex-valued beamforming coefficient.

In a third possible implementation form of the analog polarization adjustment transmitter according to the second implementation form of the third aspect, the modulation circuitry is configured to modulate the analog complex-valued beamforming coefficient to a frequency that has the negated value of the Doppler shift corresponding to the concerned beam.

In a fourth possible implementation form of the analog polarization adjustment transmitter according to the third aspect as such or according to the first implementation form of the third aspect, each polarization adjustment transmission circuit comprises: a mixer configured to mix the analog complex-valued communication signal with a Doppler shift compensation frequency to provide a Doppler shift compensated analog complex-valued communication signal.

In a fifth possible implementation form of the analog polarization adjustment transmitter according to the fourth implementation form of the third aspect, the analog polarization adjustment transmitter comprises: one of a multiplication circuitry or a delay line coupled between the mixer and the first and second analog multiplication circuits.

In a sixth possible implementation form of the analog polarization adjustment transmitter according to the third aspect as such or according to any of the preceding implementation forms of the third aspect, each polarization adjustment transmission circuit comprises: a delay line configured to delay the analog complex-valued communication signal with a time delay to provide a delay compensated analog complex-valued communication signal.

In a seventh possible implementation form of the analog polarization adjustment transmitter according to the third aspect as such or according to the sixth implementation form of the third aspect, the analog polarization adjustment transmitter comprises: one of a multiplication circuitry providing a beamforming operation or a multiplication circuitry providing a Doppler shift compensation coupled between the delay line and the first and second analog multiplication circuits.

In an eighth possible implementation form of the analog polarization adjustment transmitter according to the third aspect as such or according to any of the preceding implementation forms of the third aspect, the first and second analog multiplication circuits comprise at least one Gilbert cell.

In a ninth possible implementation form of the analog polarization adjustment transmitter according to the eighth implementation form of the third aspect, the Gilbert cell is a real multiplication Gilbert cell that performs real valued multiplication operation.

In a tenth possible implementation form of the analog polarization adjustment transmitter according to the third aspect as such or according to any of the preceding implementation forms of the third aspect, the first coefficient input and the second coefficient input are coupled to a digital-to-analog converter or a shift-register circuit providing the first and second analog real-valued polarization adjustment coefficients.

In an eleventh possible implementation form of the analog polarization adjustment transmitter according to the third aspect as such or according to any of the preceding implementation forms of the third aspect, the analog polarization adjustment transmitter comprises a signal combiner configured to combine the first polarization component of the dual-polarized antenna signal and a first polarization component of the dual-polarized antenna signal provided by a further analog polarization adjustment transmitter to provide a combined first polarization component of the dual-polarized antenna signal at the respective antenna port of the array of antenna ports.

According to a fourth aspect, the invention relates to an analog polarization adjustment receiver, comprising: a plurality of polarization adjustment reception circuits connected in parallel between an array of antenna ports and a signal output, wherein each antenna port of the array of antenna ports is configured to receive a dual-polarized antenna signal having a first polarization component and a second polarization component, wherein the signal output is configured to provide an analog complex-valued communication signal having an in-phase and a quadrature component, wherein each polarization adjustment reception circuit is connected between a respective antenna port of the array of antenna ports and the signal output, wherein each polarization adjustment reception circuit comprises a first coefficient input for receiving a first analog real-valued polarization adjustment coefficient of a set of first analog real-valued polarization adjustment coefficients and a second coefficient input for receiving a second analog real-valued polarization adjustment coefficient of a set of second analog real-valued polarization adjustment coefficients, and wherein each polarization adjustment reception circuit comprises: a first analog multiplication circuit configured to multiply the first polarization component of the dual polarized antenna signal at the respective antenna port of the array of antenna ports with the first analog real-valued polarization adjustment coefficient to provide a contribution to the analog complex-valued communication signal at the signal output; and a second analog multiplication circuit configured to multiply the second polarization component of the dual polarized antenna signal at the respective antenna port of the array of antenna ports with the second analog real-valued polarization adjustment coefficient to provide a contribution to the analog complex-valued communication signal at the signal output.

In a first possible implementation form of the analog polarization adjustment receiver according to the fourth aspect, the analog polarization adjustment receiver comprises: an adder configured to add the contributions to the analog complex-valued communication signal provided by the first and second analog multiplication circuits.

In a second possible implementation form of the analog polarization adjustment receiver according to the first implementation form of the fourth aspect, each polarization adjustment reception circuit further comprises a third coefficient input for receiving an analog complex-valued beamforming coefficient of a set of analog complex-valued beamforming coefficients, and each polarization adjustment reception circuit further comprises: an analog complex-valued multiplication circuit coupled between a respective one of the first and second analog multiplication circuits and the signal output, wherein the analog complex-valued multiplication circuit is configured to multiply an output signal of the adder with the analog complex-valued beamforming coefficient to provide a beamformed analog complex-valued communication signal at the signal output.

In a third possible implementation form of the analog polarization adjustment receiver according to the fourth aspect as such or according to any one of the preceding implementation forms of the fourth aspect, the analog polarization adjustment receiver comprises: a modulation circuitry configured to modulate the analog complex-valued beamforming coefficient based on a Doppler shift corresponding to a beam formed by the analog complex-valued beamforming coefficient.

In a fourth possible implementation form of the analog polarization adjustment receiver according to the third implementation form of the fourth aspect, the modulation circuitry is configured to modulate the analog complex-valued beamforming coefficient to a frequency that has the negated value of the Doppler shift corresponding to the concerned beam.

In a fifth possible implementation form of the analog polarization adjustment receiver according to the fourth aspect as such or according to any one of the preceding implementation forms of the fourth aspect, each polarization adjustment reception circuit comprises: a mixer configured to mix the contributions or a sum of such contributions to the analog complex-valued communication signal provided by the first and second analog multiplication circuits with a Doppler shift compensation frequency to provide a Doppler shift compensated contribution to the analog complex-valued communication signal at the signal output.

In a sixth possible implementation form of the analog polarization adjustment receiver according to the fourth aspect as such or according to any one of the preceding implementation forms of the fourth aspect, each polarization adjustment reception circuit comprises: a delay line configured to delay the contribution to the analog complex-valued communication signal at the signal output with a time delay to provide a delay compensated contribution to the analog complex-valued communication signal at the signal output.

In a seventh possible implementation form of the analog polarization adjustment receiver according to the fourth aspect as such or according to any one of the preceding implementation forms of the fourth aspect, the first and second analog multiplication circuits comprise at least one Gilbert cell.

In an eighth possible implementation form of the analog polarization adjustment receiver according to the seventh implementation form of the fourth aspect, the Gilbert cell is a real multiplication Gilbert cell that performs real valued multiplication operation.

In a ninth possible implementation form of the analog polarization adjustment receiver according to the fourth aspect as such or according to any one of the preceding implementation forms of the fourth aspect, the first coefficient input and the second coefficient input are coupled to a digital-to-analog converter or a shift-register circuit providing the first and second analog real-valued polarization adjustment coefficients.

In a tenth possible implementation form of the analog polarization adjustment receiver according to the ninth implementation form of the fourth aspect, the signal output is coupled to an analog-to-digital converter to provide a digital complex-valued communication signal, wherein a sampling rate of the analog-to-digital converter is greater than a sampling rate of the digital-to-analog converter that is used for converting coefficients.

According to a fifth aspect, the invention relates to an analog Doppler shift compensation transmitter, comprising: a plurality of transmission circuits coupled in parallel between a signal input and an array of antenna ports, wherein the signal input is configured to receive an analog complex-valued communication signal having an in-phase and a quadrature component, wherein each antenna port of the array of antenna ports is configured to provide an antenna signal, wherein each transmission circuit is coupled between the signal input and a respective antenna port of the array of antenna ports, wherein each transmission circuit comprises: a Doppler shift unit configured to provide a compensation of the antenna signal at the respective antenna port of the array of antenna ports based on a Doppler shift compensation frequency.

In a first possible implementation form of the analog Doppler shift compensation transmitter according to the fifth aspect, the antenna signal is one of a dual-polarized antenna signal having a first polarization component and a second polarization component or a single polarized antenna signal having one polarization component.

In a second possible implementation form of the analog Doppler shift compensation transmitter according to the fifth aspect as such or according to the first implementation form of the fifth aspect, each transmission circuit comprises: a delay line configured to delay the analog complex-valued communication signal with a time delay.

In a third possible implementation form of the analog Doppler shift compensation transmitter according to the fifth aspect as such or according to any one of the preceding implementation forms of the fifth aspect, each transmission circuit comprises a first coefficient input for receiving a first analog complex-valued beamforming coefficient of a set of first analog complex-valued beamforming coefficients, and each transmission circuit comprises: a first analog complex-valued multiplication circuit configured to multiply the analog complex-valued communication signal with the first analog complex-valued beamforming coefficient.

In a fourth possible implementation form of the analog Doppler shift compensation transmitter according to the third implementation form of the fifth aspect, each transmission circuit comprises a second coefficient input for receiving a second analog complex-valued beamforming coefficient of a set of second analog complex-valued beamforming coefficients, and each transmission circuit comprises: a second analog complex-valued multiplication circuit configured to multiply the analog complex-valued communication signal with the second analog complex-valued beamforming coefficient.

In a fifth possible implementation form of the analog Doppler shift compensation transmitter according to the fifth aspect as such or according to any one of the preceding implementation forms of the fifth aspect, the Doppler shift unit comprises a mixer, configured to mix the analog complex-valued communication signal with the Doppler shift compensation frequency to provide the compensation of the antenna signal.

In a sixth possible implementation form of the analog Doppler shift compensation transmitter according to the fourth implementation form of the fifth aspect, the Doppler shift unit comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients, in particular to a frequency that has the negated value of the Doppler shift corresponding to the concerned beam.

In a seventh possible implementation form of the analog Doppler shift compensation transmitter according to any one of the third to the sixth implementation forms of the fifth aspect, the first and second analog complex-valued multiplication circuits comprise at least one Gilbert cell.

In an eighth possible implementation form of the analog Doppler shift compensation transmitter according to the seventh implementation form of the fifth aspect, the Gilbert cell is a complex multiplication Gilbert cell that performs complex valued multiplication operation.

In a ninth possible implementation form of the analog Doppler shift compensation transmitter according to any one of the fourth to the eighth implementation forms of the fifth aspect, the first coefficient input and the second coefficient input are coupled to a digital-to-analog converter or a shift-register circuit providing the first and second analog complex-valued beamforming coefficients.

In a tenth possible implementation form of the analog Doppler shift compensation transmitter according to the fifth aspect as such or according to any one of the preceding implementation forms of the fifth aspect, the analog Doppler shift compensation transmitter comprises a signal combiner configured to combine the antenna signal and the antenna signal provided by a further analog Doppler shift compensation transmitter to provide a combined antenna signal at the respective antenna port of the array of antenna ports.

In an eleventh possible implementation form of the analog Doppler shift compensation transmitter according to the third implementation form of the fifth aspect, each transmission circuit comprises a third coefficient input for receiving a first analog real-valued polarization adjustment coefficient of a set of first analog real-valued polarization adjustment coefficients, and each transmission circuit comprises: a third analog multiplication circuit configured to multiply the analog complex-valued communication signal with the first analog real-valued polarization adjustment coefficient.

According to a sixth aspect, the inventions relates to an analog Doppler shift compensation receiver, comprising: a plurality of reception circuits connected in parallel between an array of antenna ports and a signal output, wherein each antenna port of the array of antenna ports is configured to receive an antenna signal, wherein the signal output is configured to provide an analog complex-valued communication signal having an in-phase and a quadrature component, wherein each reception circuit is connected between a respective antenna port of the array of antenna ports and the signal output, wherein each reception circuit comprises: a Doppler shift unit, configured to provide a compensated contribution to the analog complex-valued communication signal at the signal output based on a Doppler shift compensation frequency.

In a first possible implementation form of the analog Doppler shift compensation receiver according to the sixth aspect, the antenna signal is one of a dual-polarized antenna signal having a first polarization component and a second polarization component or a single polarized antenna signal having one polarization component.

In a second possible implementation form of the analog Doppler shift compensation receiver according to the first implementation form of the sixth aspect, the mixer is configured to mix the first and second polarization components of the dual polarized antenna signal or to mix a weighted sum of the first and second polarization components of the dual polarized antenna signal.

In a third possible implementation form of the analog Doppler shift compensation receiver according to the sixth aspect as such or according to any one of the preceding implementation forms of the sixth aspect, each reception circuit comprises: a delay line configured to delay the contribution to the analog complex-valued communication signal at the signal output with a time delay to provide a delay compensated contribution to the analog complex-valued communication signal at the signal output.

In a fourth possible implementation form of the analog Doppler shift compensation receiver according to the sixth aspect as such or according to any one of the preceding implementation forms of the sixth aspect, each reception circuit comprises a first coefficient input for receiving a first analog complex-valued beamforming coefficient of a set of first analog complex-valued beamforming coefficients, and each reception circuit comprises: a first analog complex-valued multiplication circuit configured to multiply the antenna signal at the respective antenna port of the array of antenna ports with the first analog complex-valued beamforming coefficient to provide a contribution to the analog complex-valued communication signal.

In a fifth possible implementation form of the analog Doppler shift compensation receiver according to the sixth aspect as such or according to any one of the preceding implementation forms of the sixth aspect, each reception circuit comprises a first coefficient input for receiving a first analog complex-valued beamforming coefficient of a set of first analog complex-valued beamforming coefficients and a second coefficient input for receiving a second analog complex-valued beamforming coefficient of a set of second analog complex-valued beamforming coefficients, and each reception circuit comprises: a first analog complex-valued multiplication circuit configured to multiply the first polarization component of the dual polarized antenna signal at the respective antenna port of the array of antenna ports with the first analog complex-valued beamforming coefficient to provide a contribution to the analog complex-valued communication signal; and a first second complex-valued multiplication circuit configured to multiply the second polarization component of the dual polarized antenna signal at the respective antenna port of the array of antenna ports with the second analog complex-valued beamforming coefficient to provide a contribution to the analog complex-valued communication signal.

In a sixth possible implementation form of the analog Doppler shift compensation receiver according to the sixth aspect as such or according to any one of the preceding implementation forms of the sixth aspect, the Doppler shift unit comprises a mixer, configured to mix the antenna signal at the respective antenna port of the array of antenna ports with the Doppler shift compensation frequency to provide the compensated contribution to the analog complex-valued communication signal.

In a seventh possible implementation form of the analog Doppler shift compensation receiver according to the fifth implementation form of the sixth aspect, the Doppler shift unit comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients, in particular to a frequency that has the negated value of the Doppler shift corresponding to the concerned beam.

In an eighth possible implementation form of the analog Doppler shift compensation receiver according to the sixth aspect as such or according to any one of the preceding implementation forms of the sixth aspect, the first and second analog complex-valued multiplication circuits comprise at least one Gilbert cell.

In a ninth possible implementation form of the analog Doppler shift compensation receiver according to the eighth implementation form of the sixth aspect, the Gilbert cell is a complex multiplication Gilbert cell that performs complex valued multiplication operation.

In a tenth possible implementation form of the analog Doppler shift compensation receiver according to any one of the fifth to the ninth implementation forms of the sixth aspect, the first coefficient input and the second coefficient input are coupled to a digital-to-analog converter or a shift-register circuit providing the first and second analog complex-valued beamforming coefficients that are computed in digital baseband processing.

In an eleventh possible implementation form of the analog Doppler shift compensation receiver according to tenth implementation form of the sixth aspect, the signal output is coupled to an analog-to-digital converter to provide a digital complex-valued communication signal, wherein a sampling rate of the analog-to-digital converter is greater than a sampling rate of the digital-to-analog converter that is used for converting coefficients.

According to a seventh aspect, the invention relates to an analog delay compensation transmitter, comprising: a plurality of transmission circuits coupled in parallel between a signal input and an array of antenna ports, wherein the signal input is configured to receive an analog complex-valued communication signal having an in-phase and a quadrature component, wherein each antenna port of the array of antenna ports is configured to provide an antenna signal, wherein each transmission circuit is coupled between the signal input and a respective antenna port of the array of antenna ports, wherein each transmission circuit comprises: a delay line configured to delay the analog complex-valued communication signal with a time delay to provide a delay compensated antenna signal at the respective antenna port of the array of antenna ports.

In a first possible implementation form of the analog delay compensation transmitter according to the seventh aspect, the antenna signal is one of a dual-polarized antenna signal having a first polarization component and a second polarization component or a single polarized antenna signal having one polarization component.

In a second possible implementation form of the analog delay compensation transmitter according to the seventh aspect as such or according to the first implementation form of the seventh aspect, each transmission circuit comprises: a mixer configured to mix the analog complex-valued communication signal or the delay compensated antenna signal with a Doppler shift compensation frequency to provide a Doppler shift compensated analog complex-valued communication signal.

In a third possible implementation form of the analog delay compensation transmitter according to the seventh aspect as such or according to any one of the preceding implementation forms of the seventh aspect, each transmission circuit comprises a first coefficient input for receiving a first analog complex-valued beamforming coefficient of a set of first analog complex-valued beamforming coefficients, and each transmission circuit comprises: a first analog complex-valued multiplication circuit configured to multiply the analog complex-valued communication signal with the first analog complex-valued beamforming coefficient.

In a fourth possible implementation form of the analog delay compensation transmitter according to the third implementation form of the seventh aspect, each transmission circuit comprises a second coefficient input for receiving a second analog complex-valued beamforming coefficient of a set of second analog complex-valued beamforming coefficients, and each transmission circuit comprises: a second analog complex-valued multiplication circuit configured to multiply the analog complex-valued communication signal with the second analog complex-valued beamforming coefficient.

In a fifth possible implementation form of the analog delay compensation transmitter according to the fourth implementation form of the seventh aspect, the analog delay compensation transmitter comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients.

In a sixth possible implementation form of the analog delay compensation transmitter according to the fifth implementation form of the seventh aspect, the modulation circuitry is configured to modulate the first analog complex-valued beamforming coefficient and the second analog complex-valued beamforming coefficient to a frequency that has the negated value of the Doppler shift corresponding to the concerned beam.

In a seventh possible implementation form of the analog delay compensation transmitter according to any one of the fourth to the sixth implementation forms of the seventh aspect, the first and second analog complex-valued multiplication circuits comprise at least one Gilbert cell.

In an eighth possible implementation form of the analog delay compensation transmitter according to the seventh implementation form of the seventh aspect, the Gilbert cell is a complex multiplication Gilbert cell that performs complex valued multiplication operation.

In a ninth possible implementation form of the analog delay compensation transmitter according to any one of the fourth to the eighth implementation forms of the seventh aspect, the first coefficient input and the second coefficient input are coupled to a digital-to-analog converter or a shift-register circuit providing the first and second analog complex-valued beamforming coefficients.

In a tenth possible implementation form of the analog delay compensation transmitter according to any one of the fourth to the ninth implementation forms of the seventh aspect, the analog delay compensation transmitter comprises a signal combiner configured to combine the first polarization component of the dual-polarized antenna signal and a first polarization component of the dual-polarized antenna signal provided by a further analog delay compensation transmitter to provide a combined first polarization component of the dual-polarized antenna signal at the respective antenna port of the array of antenna ports.

In an eleventh possible implementation form of the analog delay compensation transmitter according to the tenth implementation form of the seventh aspect, each transmission circuit comprises a third coefficient input for receiving a first analog real-valued polarization adjustment coefficient of a set of first analog real-valued polarization adjustment coefficients, and each transmission circuit comprises: a third analog complex-valued multiplication circuit configured to multiply the analog complex-valued communication signal with the first analog real-valued polarization adjustment coefficient.

According to an eighth aspect, the inventions relates to an analog Delay compensation receiver, comprising: a plurality of reception circuits connected in parallel between an array of antenna ports and a signal output, wherein each antenna port of the array of antenna ports is configured to receive an antenna signal, wherein the signal output is configured to provide an analog complex-valued communication signal having an in-phase and a quadrature component, wherein each reception circuit is connected between a respective antenna port of the array of antenna ports and the signal output, wherein each reception circuit comprises: a delay line configured to delay the antenna signal at the respective antenna port of the array of antenna ports with a time delay to provide a delay compensation of the analog complex-valued communication signal at the signal output.

In a first possible implementation form of the analog delay compensation receiver according to the eighth aspect, the antenna signal is one of a dual-polarized antenna signal having a first polarization component and a second polarization component or a single polarized antenna signal having one polarization component.

In a second possible implementation form of the analog delay compensation receiver according to the eighth aspect as such or according to the first implementation form of the eighth aspect, each reception circuit comprises: a mixer configured to mix the analog complex-valued communication signal or the delay compensation of the analog complex-valued communication signal provided by the delay line with a Doppler shift compensation frequency to provide a Doppler shift compensation of the analog complex-valued communication signal at the signal output.

In a third possible implementation form of the analog delay compensation receiver according to the eighth aspect as such or according to any one of the preceding implementation form of the eighth aspect, each reception circuit comprises a first coefficient input for receiving a first analog complex-valued beamforming coefficient of a set of first analog complex-valued beamforming coefficients, and each reception circuit comprises: a first analog complex-valued multiplication circuit configured to multiply the antenna signal at the respective antenna port of the array of antenna ports with the first analog complex-valued beamforming coefficient to provide the analog complex-valued communication signal.

In a fourth possible implementation form of the analog delay compensation receiver according to the eighth aspect as such or according to any one of the preceding implementation forms of the eighth aspect, each reception circuit comprises a first coefficient input for receiving a first analog complex-valued beamforming coefficient of a set of first analog complex-valued beamforming coefficients and a second coefficient input for receiving a second analog complex-valued beamforming coefficient of a set of second analog complex-valued beamforming coefficients, and each reception circuit comprises: a first analog complex-valued multiplication circuit configured to multiply the first polarization component of the dual polarized antenna signal at the respective antenna port of the array of antenna ports with the first analog complex-valued beamforming coefficient to provide a contribution to the analog complex-valued communication signal; and a second analog complex-valued multiplication circuit configured to multiply the second polarization component of the dual polarized antenna signal at the respective antenna port of the array of antenna ports with the second analog complex-valued beamforming coefficient to provide a contribution to the analog complex-valued communication signal.

In a fifth possible implementation form of the analog delay compensation receiver according to the fourth implementation form of the eighth aspect, the analog delay compensation receiver comprises: a modulation circuitry configured to modulate the first analog complex-valued beamforming coefficient and the second analog complex-valued beamforming coefficient based on a Doppler shift corresponding to a beam formed by the first and second analog complex-valued beamforming coefficients.

In a sixth possible implementation form of the analog delay compensation receiver according to the fifth implementation form of the eighth aspect, the modulation circuitry is configured to modulate the first analog complex-valued beamforming coefficient and the second analog complex-valued beamforming coefficient to a frequency that has the negated value of the Doppler shift corresponding to the concerned beam.

In a seventh possible implementation form of the analog delay compensation receiver according to any one of the fourth to the sixth implementation forms of the eighth aspect, the first and second analog complex-valued multiplication circuits comprise at least one Gilbert cell.

In an eighth possible implementation form of the analog delay compensation receiver according to the seventh implementation form of the eighth aspect, the Gilbert cell is a complex multiplication Gilbert cell that performs complex valued multiplication operation.

In a ninth possible implementation form of the analog delay compensation receiver according to any one of the fourth to the eighth implementation forms of the eighth aspect, the first coefficient input and the second coefficient input are coupled to a digital-to-analog converter or a shift-register circuit providing the first and second analog complex-valued beamforming coefficients that are computed in digital baseband processing.

In a tenth possible implementation form of the analog delay compensation receiver according to the ninth implementation form of the eighth aspect, the signal output is coupled to an analog-to-digital converter to provide a digital complex-valued communication signal, wherein a sampling rate of the analog-to-digital converter is greater than a sampling rate of the digital-to-analog converter that is used for converting coefficients.

According to a ninth aspect, the invention relates to an antenna arrangement, comprising: a plurality of beamforming reception circuits connected in parallel between an antenna port and a signal output, wherein the antenna port is configured to receive a dual-polarized antenna signal having a first polarization component and a second polarization component and wherein each beamforming reception circuit is configured to beamform the antenna signal; and a signal distribution unit coupled between the antenna port and the plurality of beamforming reception circuits and configured to distribute the dual-polarized antenna signal to the plurality of beamforming reception circuits.

According to a tenth aspect, the invention relates to an antenna arrangement, comprising: a plurality of polarization adjustment reception circuits connected in parallel between an antenna port and a signal output, wherein the antenna port is configured to receive an antenna signal and wherein each polarization adjustment reception circuit is configured to provide a polarization adjustment of the antenna signal; and a signal distribution unit coupled between the antenna port and the plurality of polarization adjustment reception circuits and configured to distribute the antenna signal to the plurality of polarization adjustment reception circuits.

According to a tenth aspect, the invention relates to a beamforming method, comprising the following steps: Selecting propagation paths/directions for beamforming based on path gains and the change of polarization in each path, including e.g. the rotation of the signal polarization and attenuation of the signal with certain polarization angle; Forming beams in the directions of the selected propagation paths; Adjusting the polarization of each beam by weighting the signals fed to/received from orthogonally polarized antennas, according to the change of the polarization of the corresponding transmitted signal in the corresponding path and the polarization of the receiver; Adjusting each time delay of each single beam to pre/post-compensate propagation delay difference between multiple paths.

The change of polarization denotes the change of the signal polarization in a propagation path due to reflectors, e.g. those only reflecting V polarization but absorbing all H polarized signals.

In a first possible implementation form of the beamforming method according to the tenth aspect, the beamforming method further comprises the step of pre-compensating for the Doppler shift of each single beam/path.

According to an eleventh aspect, the invention relates to a Baseband analog circuit architecture (structure A+delay taps) of polarimetric filtering based beam-forming, comprising: Usage of Gilbert cells for complex multiplication: beam-forming operation covers both amplitude and phase adjustment of the signal (Structure B option 1&2).

According to a twelfth aspect, the invention relates to a Baseband/RF analog circuit architecture for pre-compensation of Doppler shift, comprising: Usage of low speed DACs and Gilbert cells for Doppler pre-compensation in baseband: 2 alternative architectures; and Usage of RF mixers for Doppler pre-compensation in RF: 1 architecture.

BRIEF DESCRIPTION OF THE DRAWINGS

Further embodiments of the invention will be described with respect to the following figures, in which.

DETAILED DESCRIPTION OF EMBODIMENTS

Figure 1:
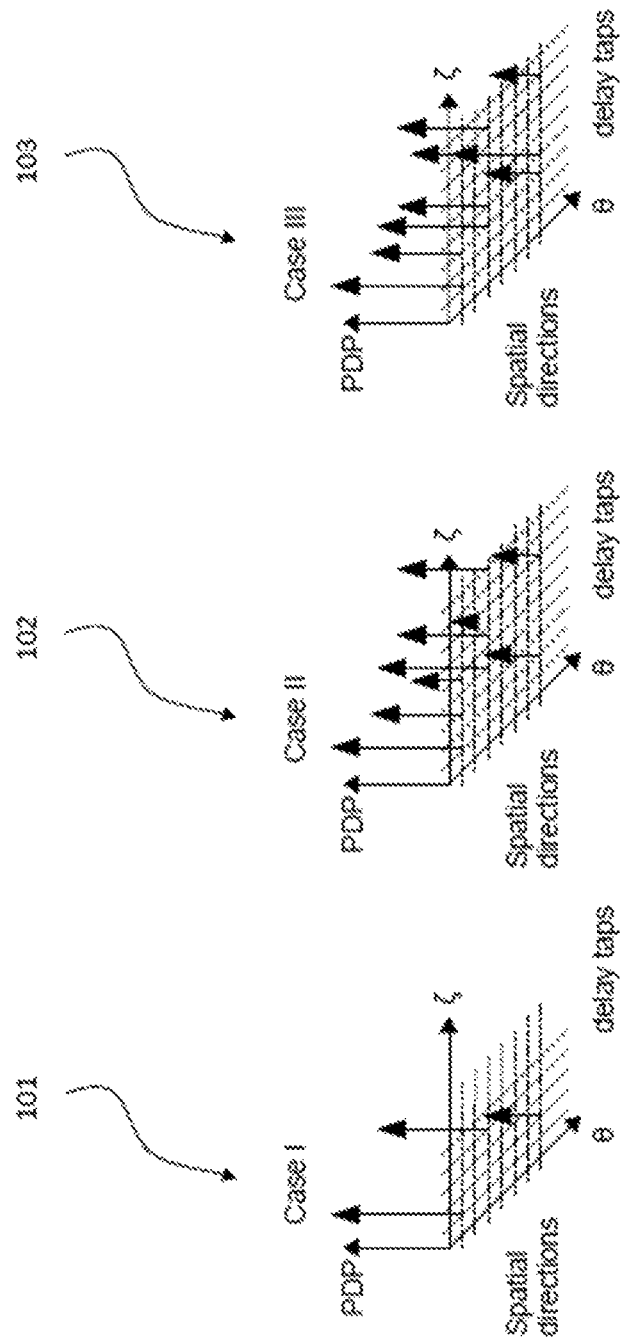
FIG. 1a shows a diagram illustrating a power delay profile according to a case I beam delay matrix 101.
FIG. 1b shows a diagram illustrating a power delay profile according to a case II beam delay matrix 102.
FIG. 1c shows a diagram illustrating a power delay profile according to a case III beam delay matrix 103.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1a shows a diagram illustrating a power delay profile according to a case I beam delay matrix 101; FIG. 1b shows a diagram illustrating a power delay profile according to a case II beam delay matrix 102 and FIG. 1c shows a diagram illustrating a power delay profile according to a case III beam delay matrix 103.

Two communication entities are considered: base station (BS) and mobile equipment (UE). In the following, the typical case is considered that most of the beamforming signal processing is performed in the BS. However, there can also be the case that the UE performs the most beamforming signal processing.

Two links are defined regarding the direction of communications: down-link (from BS to UE) and up-link (from UE to BS). In the down-link case, the BS calculates the coefficients for the multi-beam TX-beamformer, including the weights for the beam directions and gain/phase adjustment, the weights for polarization synthesis (weighting the signals fed to orthogonally polarized antennas) and the value for per-beam delay adjustment, in order to have a coherent summation at the desired UE without any further processing of the received signal at the UE, and/or null the signal on the other users for interference suppression.

in the up-link case, the BS calculates the coefficients for the multi-beam RX-beamformer, including the weights for the beam directions and gain/phase adjustment, the weights for polarization adjustment (weighting the signals received from orthogonally polarized antennas) and the value for per-beam delay adjustment, in order to cancel undesired signals, to collect the energy of the different desired paths, and to align them in time and polarization, as well as to counteract the Doppler shift and perform a coherent sum resulting in an increase in the overall signal-to-interference plus noise ratio (SINR).

The high resolution in the time domain provided by the large bandwidth, and in the directional domain provided by the high order antenna arrays, results in a distribution of the channel taps (a channel tap is defined as a component in the channel impulse response) as shown in FIGS. 1a, 1b and 1c in terms of beam-delay matrices.

Single channel taps are distributed over the spatial and time domains in the so called beam-delay matrix. The following different cases as shown in FIGS. 1a, 1b and 1c can be distinguished: In case I (see FIG. 1a) there is a single beam per delay tap. In case II (see FIG. 1b) there are multiple delay taps per beam. In case III (see FIG. 1c) there are multiple beams per delay taps. Channel measurement results have shown that case III is less probable.

In the following a BS with a high order antenna array capable of generating narrow beams with a high spatial resolution is assumed. On the other side, UEs can have antennas with broader beams and less computation capabilities. Furthermore, the large bandwidth of the signals allows a high temporal resolution, so that the multi-path components of the channel can be identified in the delay domain. Furthermore, polarizations of the channel taps are assumed to be clear, since the paths are more deterministic and not the result of a sum of multiple paths close to each other in the delay domain. Polarization refers to polarization of the propagation paths. In lower frequency, each channel tap may be a sum of a lot of propagation paths with different polarization. Then, the polarization of each channel tap may be diffused (not clear). In mm-wave frequency, each channel tap may consist of only one propagation path with a certain polarization. Then, the polarization is clear.

In the downlink case, beamforming processing is mainly carried out at the TX. The time-reversal method is followed, where the BS pre-processes the signals in order to have a coherent summation of the beams at the UEs. In certain cases, e.g. that the UE has a single widebeam RX antenna, it doesn't need any further processing. The beamforming processing is as follows: The TX first selects a subset of propagation paths based on the channel information e.g. path gains and the change of polarization in each propagation path. This information can be retrieved from the channel matrix using channel estimation procedures. Afterwards, for compensation of the propagation delay difference of the selected paths, different delayed versions of the transmitted data stream are generated. The number of such delay versions equals to the number of different delay values of the selected paths. Each delayed version corresponds to a path or multiple paths with the same delay. The delay of each delayed version is inversely proportional to the delay of each path, so that after sending these delayed versions via the corresponding paths, the data streams in different paths arrive at the RX with the same total delay. In such a way, ISI can be mitigated.

For each delayed version of the data stream, a set of beam forming coefficients is calculated for forming beams in the directions of the corresponding selected paths. Each set of beam forming coefficients can form one or multiple beams. In order to avoid ISI, the coefficients of the beamformer for different delayed versions have to be as orthogonal (have as less cross-talk to each other) as possible.

Each set of beamforming coefficients will also compensate the amplitude and phase distortion caused by the corresponding propagation paths.

For each beam, the polarization is adjusted by properly weighting and/or optionally, delaying the signals fed to the two orthogonal polarized TX antennas. The polarization (linear or elliptical) of this beam is adjusted in a way so that it matches the polarization properties of reflecting surface and/or the polarization orientation of the UE antenna.

As an option, the Doppler-shift of each selected propagation path is compensated by adding an inverse frequency shift (that is the negated version of the Doppler-shift) to the TX signal of the corresponding beam. In summary, for each beam, the polarization, the delay, the amplitude, and the phase, and optionally the Doppler shift, are pre-adjusted to enhance the RX signal quality.

In the presence of channel case I (see FIG. 1a), each set of coefficients addresses a single beam, and there are as many set of coefficients as beams. In the case II (see FIG. 1b), each set of coefficients addresses a single beam, however, the number of set of coefficients may increase since there are more delay taps considered. On the other side, in case III (see FIG. 1c), each set of coefficients has to address several beams, since they occur in the same delay. In that case, the same symbol is sent via different directions and expected to arrive at the same time. However, the polarization, Doppler, phase and amplitude adjustment is performed individually since they undergo different propagation paths.

In the up-link case, beamforming processing is mainly done in the receiver of BS. The UEs reach the BS through the LOS path and multiple reflection paths, or only through the reflection paths in the NLOS case. However, only the paths that contribute with high relative energy are considered in order not to decrease the SNR. Each path has a certain polarization, delay, direction of arrival, and Doppler shift. The beamformer is in charge of isolating spatially the received beams per delay bins (defined as units in the delay domain). In Case I (see FIG. 1a), each received beam has a different delay. In Case II (see FIG. 1b), a beam arrives with multiple delays. In Case III (see FIG. 1c), multiple beams arrive with the same delay. In all cases, the beamformer has to address the beams individually, i.e. compensate the amplitude and phase distortion, the delay, the polarization and optionally the Doppler shift. Furthermore, the RX beams of different delay bins should be as orthogonal to each other (have as less cross talk) as possible to avoid ISI. In Case II and III, such orthogonality may not be achievable, since the signal is arriving in different delay taps from the same direction. But the discrimination of different delays can be done with the degree of freedom that polarization offers. Note that due to restriction of analog processing, a selection of RX beam directions and delay bins based on the available propagation paths may be necessary. The polarization is compensated by adjusting individually (by means of the beamformer coefficients) the output of the orthogonally polarized receiver antennas to match the polarization of the desired signal (linear or elliptical), or to reject the polarization of the interference.

Since the signals in the delay taps belong to the same data stream, they may need to be stored and then combined with the delay difference compensated for. This can, e.g., be done with a digital implementation of an FIR filter. The combination criteria, e.g. MRC, can be already implemented in the calculation of the beamformer coefficients.

The systems and devices according to the disclosure are not restricted to the typical case of doing beamforming processing at TX of downlink and at RX in uplink, respectively. In certain scenarios, the UE can also have high dimension antenna arrays and capability of performing complex analog and/or digital processing for beamforming. An example is the back-hauling link in public transports, e.g. a train, for the connection to a BS. In this case, the UE (located in the train) can be assumed to have similar hardware and signal processing complexity as the BS. In this case, both above described TX and RX processing can be performed jointly in either downlink or uplink.

Figure 2:
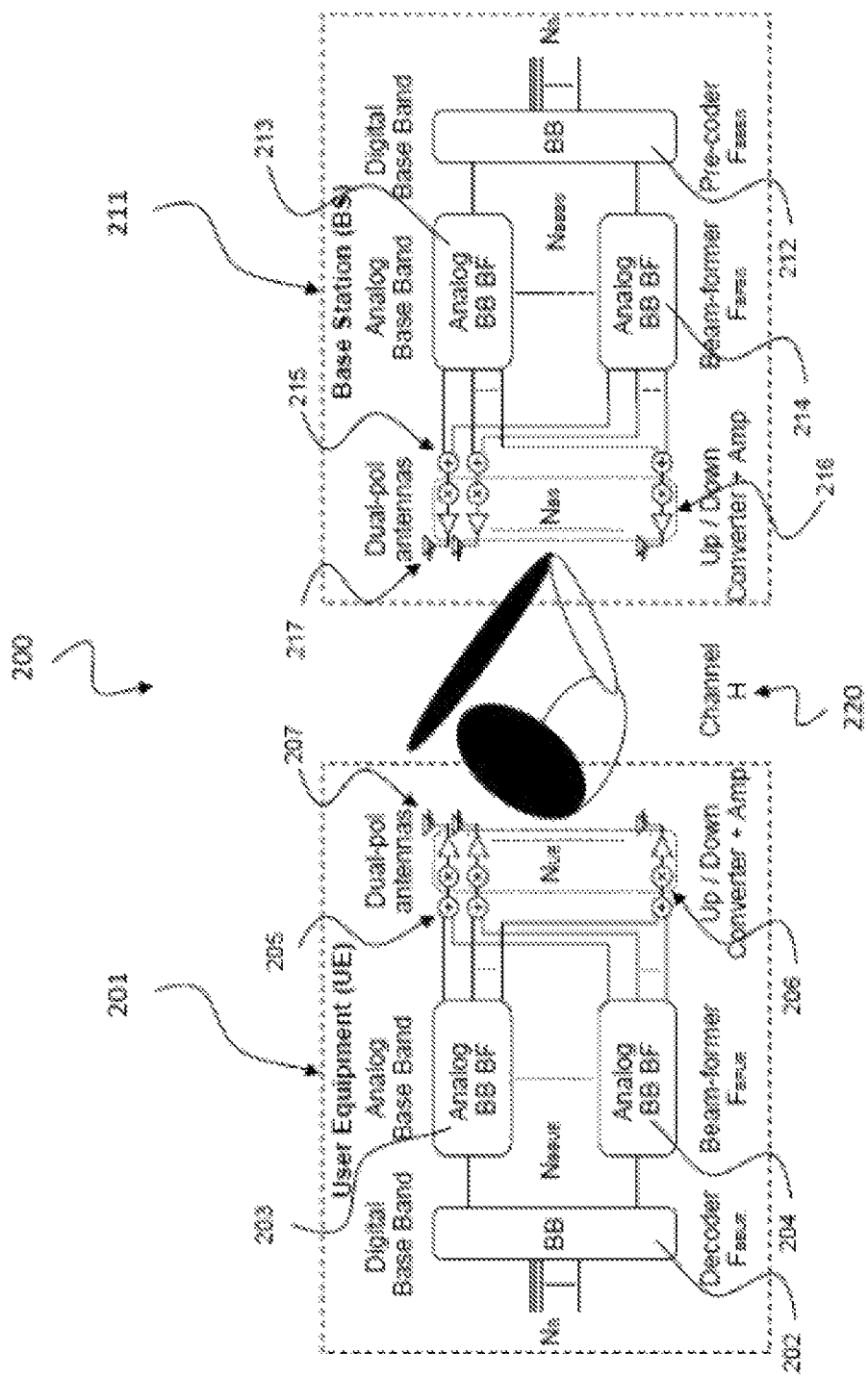
FIG. 2 shows a block diagram illustrating the structure of the hybrid digital/analog beamforming architecture 200 according to an implementation form.

FIG. 2 shows a block diagram illustrating the structure of the hybrid digital/analog beamforming architecture 200 according to an implementation form. The beamformer as illustrated in FIG. 2 can be implemented in the following three architectures: Fully digital architecture, fully analog architecture and hybrid digital/analog architecture.

In the fully digital architecture tap-delayed operation and weighting operations are all implemented in digital domain. In this case, the required number of DAC/ADC pairs (I and Q) per signal stream equals the number of antennas times two (for the two polarizations).

In the fully analog architecture tap-delayed operation and weighting operations are all implemented in analog domain. In this case, only one DAC/ADC pair (I and Q) per signal stream is required. This architecture can be combined with digital MIMO to transmit multiple signal streams.

In the hybrid digital/analog architecture a part of the operations is implemented in the digital domain, while the other part of operations is implemented in the analog domain. One example is that the tap-delayed operation is implemented in digital domain, while the weighting operation is implemented in analog domain. In this case, the required number of DAC/ADC pairs (I and Q) per signal stream equals the number of taps.

Both fully digital and fully analog architectures can be seen as special cases of the hybrid digital/analog architecture. Furthermore, the analog domain processing can be done either in baseband, at the Intermediate Frequency (IF), at the Radio Frequency (RF) or in combination of these. In the following, the described circuit structures mainly focus on baseband analog processing. However, IF processing and RF processing structures can be implemented as well.

The DAC/ADC's mentioned above may be wideband DAC/ADC's for converting the wideband data signals. However, another type of DAC/ADC's can be used for converting the coefficients of the beamforming operation, e.g. the coefficients for the tap-delayed operation or the weighting operation. These are narrow band DAC/ADC's with much lower cost and power consumption. Independently from the architecture, the beamformer coefficients may always be calculated in the digital domain. These coefficients can be time shift for compensation of different tap delays of different beams; polarization synthesis/adjustment coefficients; and Amplitude and phase coefficients for forming the beams, e.g. according to the maximum ratio combining (MRC) principle; and optionally Doppler shift coefficients In the implementation architecture 200 depicted in FIG. 2, two signals are defined: communication and control signals. While communication signals are the signals bearing data between BS and UE, control signals are the beamformer coefficients applied to the communication signals. There are as many communication branches implemented as delay taps considered in the channel.

FIG. 2 shows the structure of the hybrid digital/analog beamforming architecture 200, where $N_{BS}$ and $N_{UE}$ are the number of dual-polarized antennas at the base station and user equipment, respectively; $N_{BBBS}$=L: is the number of digital paths (equals the number of wideband DAC/ADC pairs); and $N_S$: is the number of digital data streams.

The hybrid digital/analog beamforming architecture 200 includes a user equipment 201 that is connected by a channel H 220 to a base station 211. The base station 211 includes a pre-coder 212, a plurality of analog baseband beamformers 213, 214 a plurality of adders 215, a plurality of up/down converters and amplifiers 216 and a plurality of dual-polarized antennas 207. The pre-coder 212 encodes an input signal to provide encoded signal components to the analog baseband beamformers 213, 214 which are configured to beamform the encoded input signals to provide beamformed signals to the plurality of adders 215 which add respective beamformed signal components. After the adders 215 the plurality of up/down converters and amplifiers 216 process the beamformed signals. Output signals of the up/down converters and amplifiers 216 are provided to the antenna array 217.

In the user equipment 201, the inverse circuit structure is implemented. The user equipment 201 includes a Baseband decoder 202, a plurality of analog baseband beamformers 203, 204 a plurality of adders 205, a plurality of up/down converters and amplifiers 206 and a plurality of dual-polarized antennas 207. The user equipment 201 receives a wireless signal that has been transmitted from the base station 211 at the antenna array 207. The received signal is down-converted and amplified by the plurality of up/down converters and amplifiers 206 and forwarded to the analog baseband beamformers 203, 204 which are configured to beamform the channel signal to provide beamformed channel signal to the baseband decoder 202.

Figure 3:
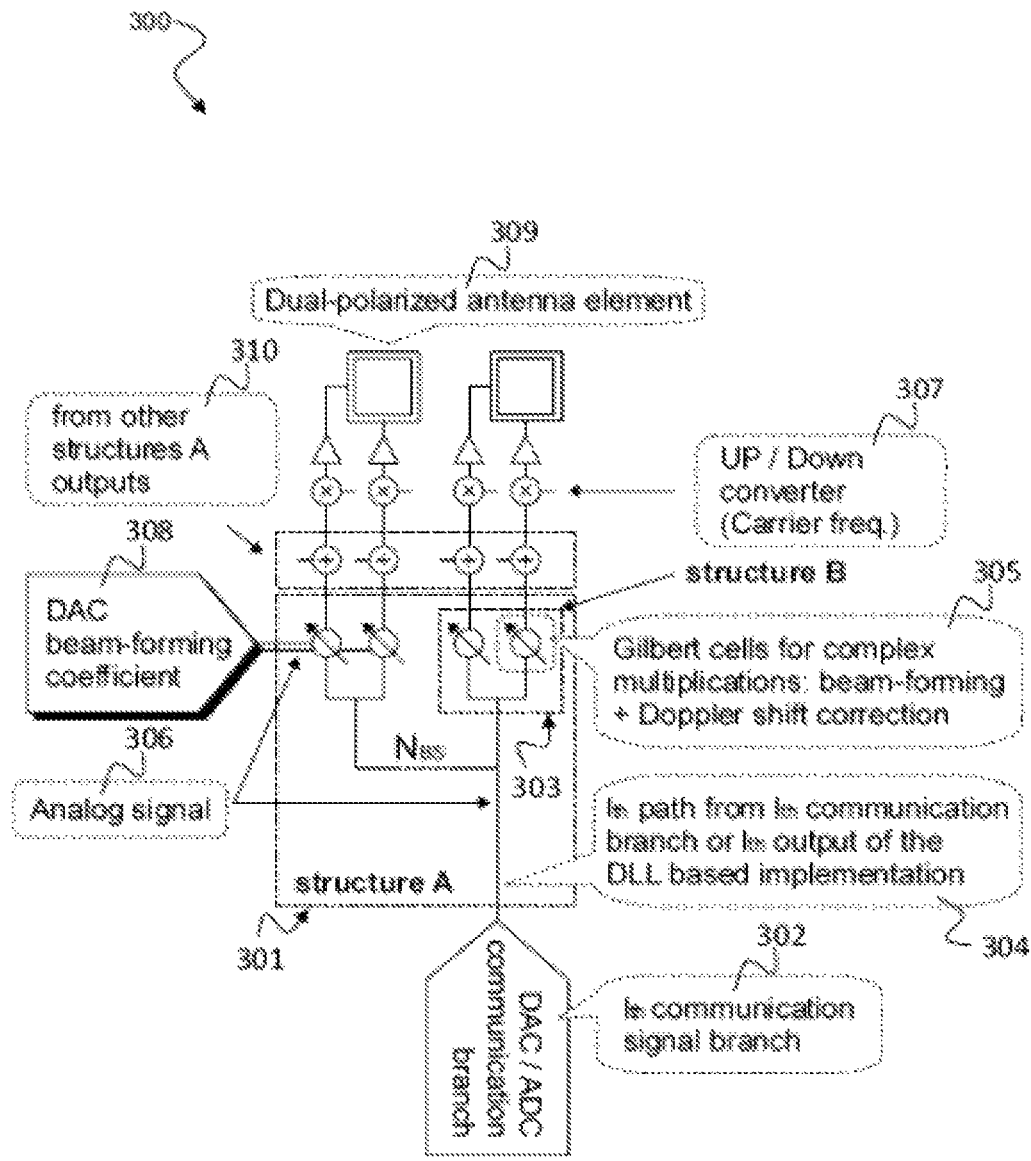
FIG. 3 shows a block diagram illustrating an analog beamformer 300 including circuit structures A 301 and B 303 according to an implementation form.

FIG. 3 shows a block diagram illustrating an analog beamformer 300 including circuit structures A 301 and B 303 according to an implementation form.

Structure A 301 corresponds to each considered delay tap, both for down- and up-link. It is the output/input for each communication branch 302. Structure B 303 is the implementation of the multiplication of the control signals (beamformer coefficients) with the communication signals.

There are as many structures A 301 as communication branches 302 (L=delay taps) considered in the implementation. One structure A 301 can address multiple beams, as long as they are all in the same time instance/delay tap L. Inside structure A 301, the communication signal is split in $N_{BS}$ branches, where $N_{BS}$ is the number of dual-polarized antenna elements 309. Since the coefficients of the beamformer 300 change the phase and amplitude of the signal, a single set of coefficients (one structure A 301) can address multiple beams taking place in the same delay tap.

Structure B 303 is in charge of multiplying the beamformer coefficients 308 with the communication signals 306 using Gilbert cells 305. There are $N_{BS}$ structures B 303 per structure A 301 (where $N_{BS}$ is the number of dual-polarized antennas 309). The structure B 303 can be implemented following two different approaches: In Implementation 1 (see FIG. 6), two complex multiplications are applied, while in Implementation 2 (see FIG. 7), two real multiplications and one complex multiplication are applied.

Figure 4A:
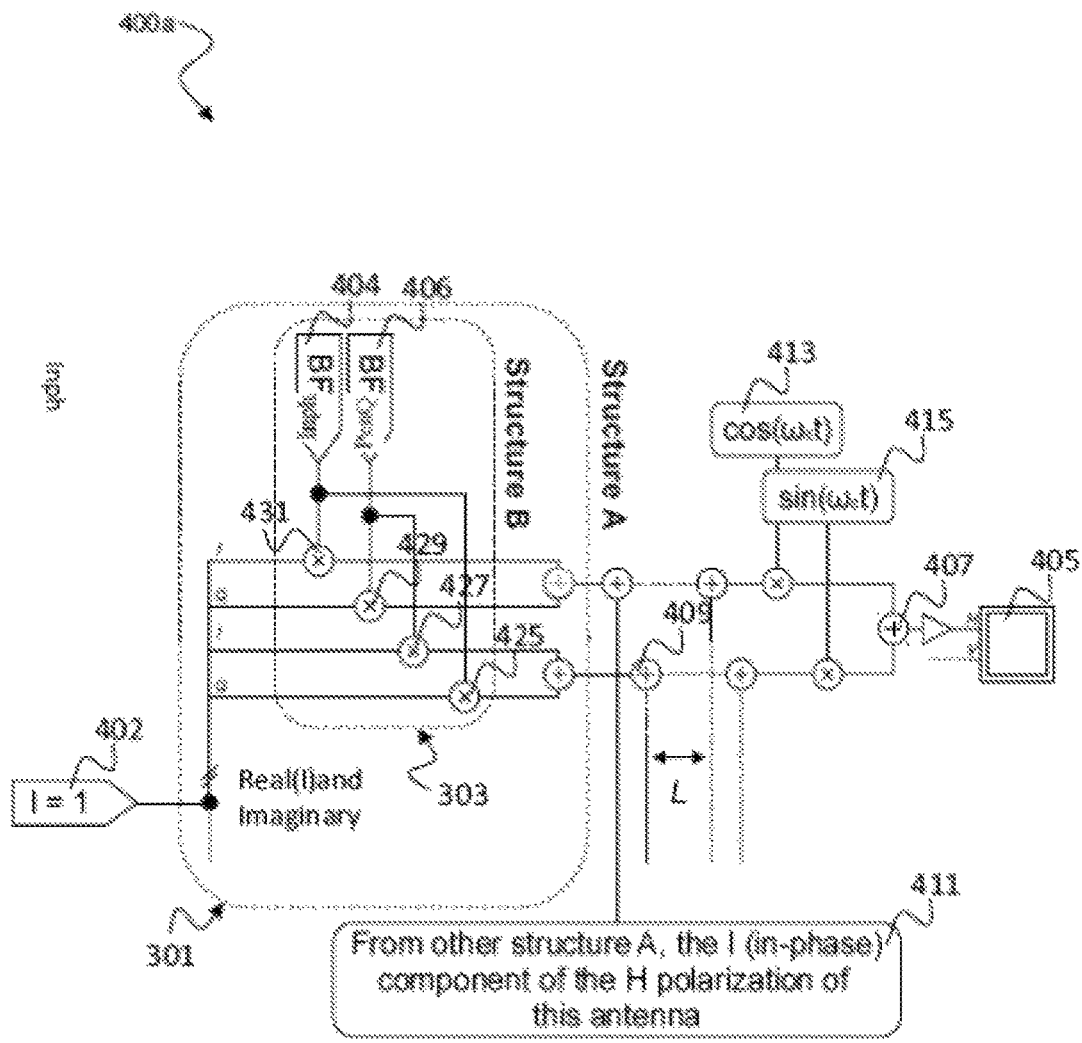
FIG. 4a shows a block diagram illustrating the TX architecture 400a of an analog beamformer according to an implementation form.

FIG. 4a shows a block diagram illustrating the TX architecture 400a of an analog beamformer according to an implementation form.

The TX architecture 400a includes a structure A 301 that is coupled between a communication signal branch 402 and an adding element 409 for adding outputs of structure A 301 with outputs of other structures A 411. The output of the adding element 409 is provided to an up-converter 413, 415 for modulation with a carrier frequency. A further adder 407 is used to generate the horizontal polarized antenna signal component from the up-converted signal and provide the H-component to the antenna element 405.

Structure A 301 includes multiple structures B 303. Each structure B 303 including a first multiplier 431 for multiplying an in-phase component of the communication signal 402 with an in-phase beamforming coefficient 404, a second multiplier 429 for multiplying a quadrature component of the communication signal 402 with a quadrature beamforming coefficient 406, a third multiplier 427 for multiplying the in-phase component of the communication signal 402 with the quadrature beamforming coefficient 406 and a fourth multiplier 425 for multiplying the quadrature component of the communication signal 402 with the in-phase beamforming coefficient 404. Each structure B 303 further includes a subtracting unit for subtracting the output signal of the second multiplier 429 from the output signal of the first multiplier 431; and an adding unit for adding the output signal of the third multiplier 427 to the output signal of the fourth multiplier 425.

Figure 4B:
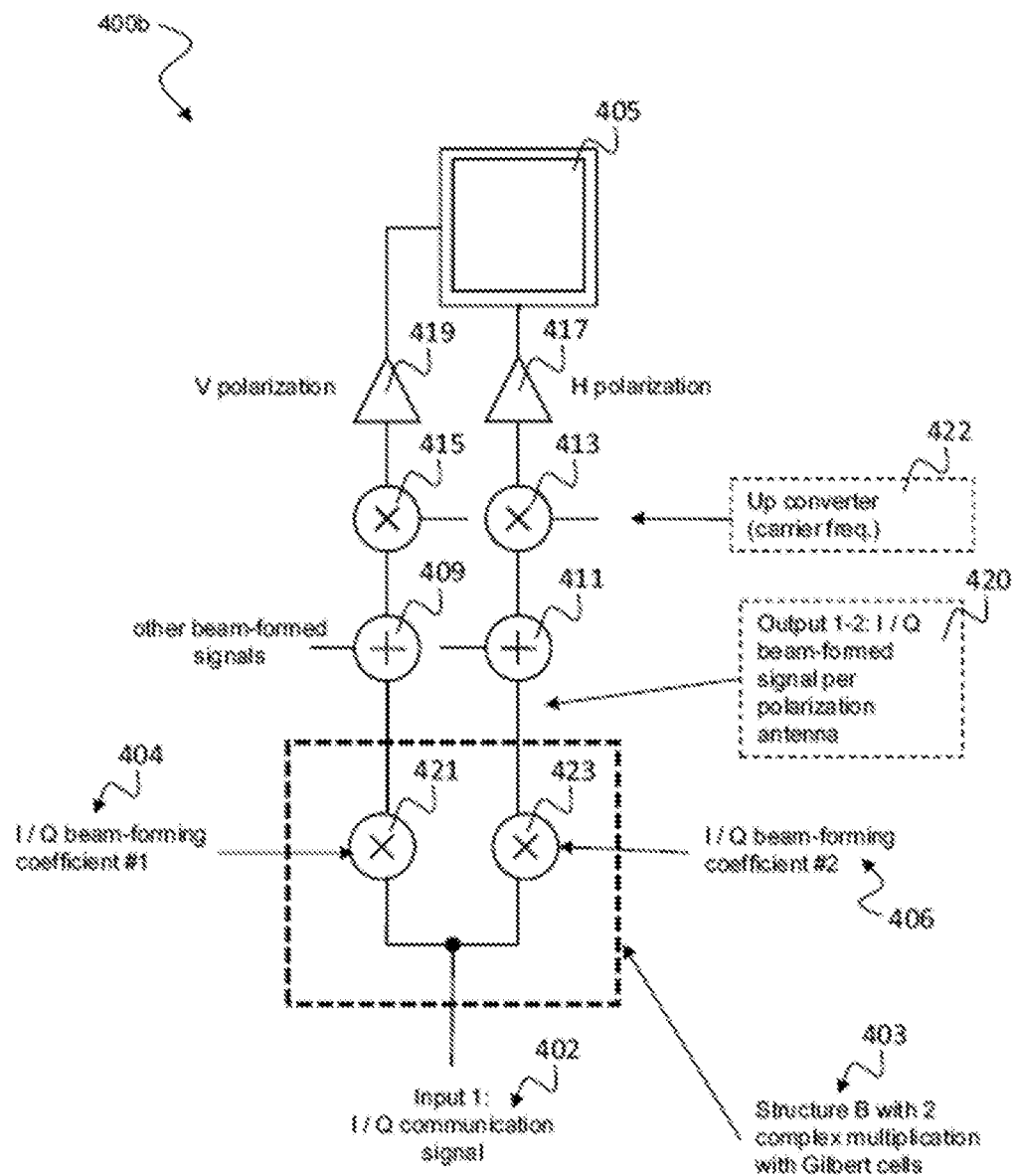
FIG. 4b shows a block diagram illustrating an analog beamforming transmitter 400b according to an implementation form.

FIG. 4b shows a block diagram illustrating an analog beamforming transmitter 400b according to an implementation form.

The analog beamforming transmitter 400b includes a plurality of beamforming transmission circuits 403 coupled in parallel between a signal input 402 and an array of antenna ports. The signal input 402 is configured to receive an analog complex-valued communication signal having an in-phase and a quadrature component. Each antenna port 405 of the array of antenna ports is configured to provide a dual-polarized antenna signal having a first polarization component 419 and a second polarization component 417. Each beamforming transmission circuit 403 is coupled between the signal input 402 and a respective antenna port 405 of the array of antenna ports. Each beamforming transmission circuit 403 includes a first coefficient input for receiving a first analog complex-valued beamforming coefficient 404 of a set of first analog complex-valued beamforming coefficients and a second coefficient input for receiving a second analog complex-valued beamforming coefficient 406 of a set of second analog complex-valued beamforming coefficients.

Each beamforming transmission circuit 403 includes a first analog complex-valued multiplication circuit 421 configured to multiply the analog complex-valued communication signal with the first analog complex-valued beamforming coefficient 404 to provide the first polarization component 419 of the dual-polarized antenna signal at the respective antenna port 405 of the array of antenna ports. Each beamforming transmission circuit 403 further includes a second analog complex-valued multiplication circuit 423 configured to multiply the analog complex-valued communication signal with the second analog complex-valued beamforming coefficient 406 to provide the second polarization component 417 of the dual-polarized antenna signal at the respective antenna port 405 of the array of antenna ports.

An adding unit 409, 411 may be coupled between the plurality of beamforming transmission circuits 403 and the antenna port 405 to sum the output signals of the beamforming transmission circuits 403 with outputs signals of other beamforming transmission circuits.

An up converter 415, 413 may be coupled between the plurality of beamforming transmission circuits 403 and the antenna port 405 to up-convert the output signals of the beamforming transmission circuits 403 to a carrier frequency.

The analog beamforming transmitter 400b may include a modulation circuitry, e.g. as described below with respect to FIGS. 12a to 12d, to modulate the first analog complex-valued beamforming coefficient and the second analog complex-valued beamforming coefficient based on a Doppler shift corresponding to a beam formed by the first and second analog complex-valued beamforming coefficients.

The modulation circuitry may modulate the first analog complex-valued beamforming coefficient and the second analog complex-valued beamforming coefficient to a frequency that has the negated value of the Doppler shift corresponding to the concerned beam.

Each beamforming transmission circuit 403 may include a mixer, e.g. as described below with respect to FIGS. 12a to 12d, to mix the analog complex-valued communication signal with a Doppler shift compensation frequency to provide a Doppler shift compensated analog complex-valued communication signal to the first and second analog complex-valued multiplication circuits 421, 423.

Each beamforming transmission circuit 403 may include a delay line, e.g. as described below with respect to FIG. 11, to delay the analog complex-valued communication signal with a time delay to provide a delay compensated analog complex-valued communication signal to the first and second analog complex-valued multiplication circuits.

The first and second analog complex-valued multiplication circuits 421, 423 may include one or more Gilbert cells. The Gilbert cell may be a complex multiplication Gilbert cell that performs complex valued multiplication operation.

The first coefficient input and the second coefficient input may be coupled to a digital-to-analog converter or a shift-register circuit or a further circuitry that conveys digital coefficients to the first and second coefficient inputs for providing the first and second analog complex-valued beamforming coefficients that are computed in digital baseband processing.

The analog beamforming transmitter 400b may further include a signal combiner 409, 411 configured to combine the first polarization component 419 of the dual-polarized antenna signal and a first polarization component of the dual-polarized antenna signal provided by a further analog beamforming transmitter to provide a combined first polarization component of the dual-polarized antenna signal at the respective antenna port 405 of the array of antenna ports.

Figure 4C:
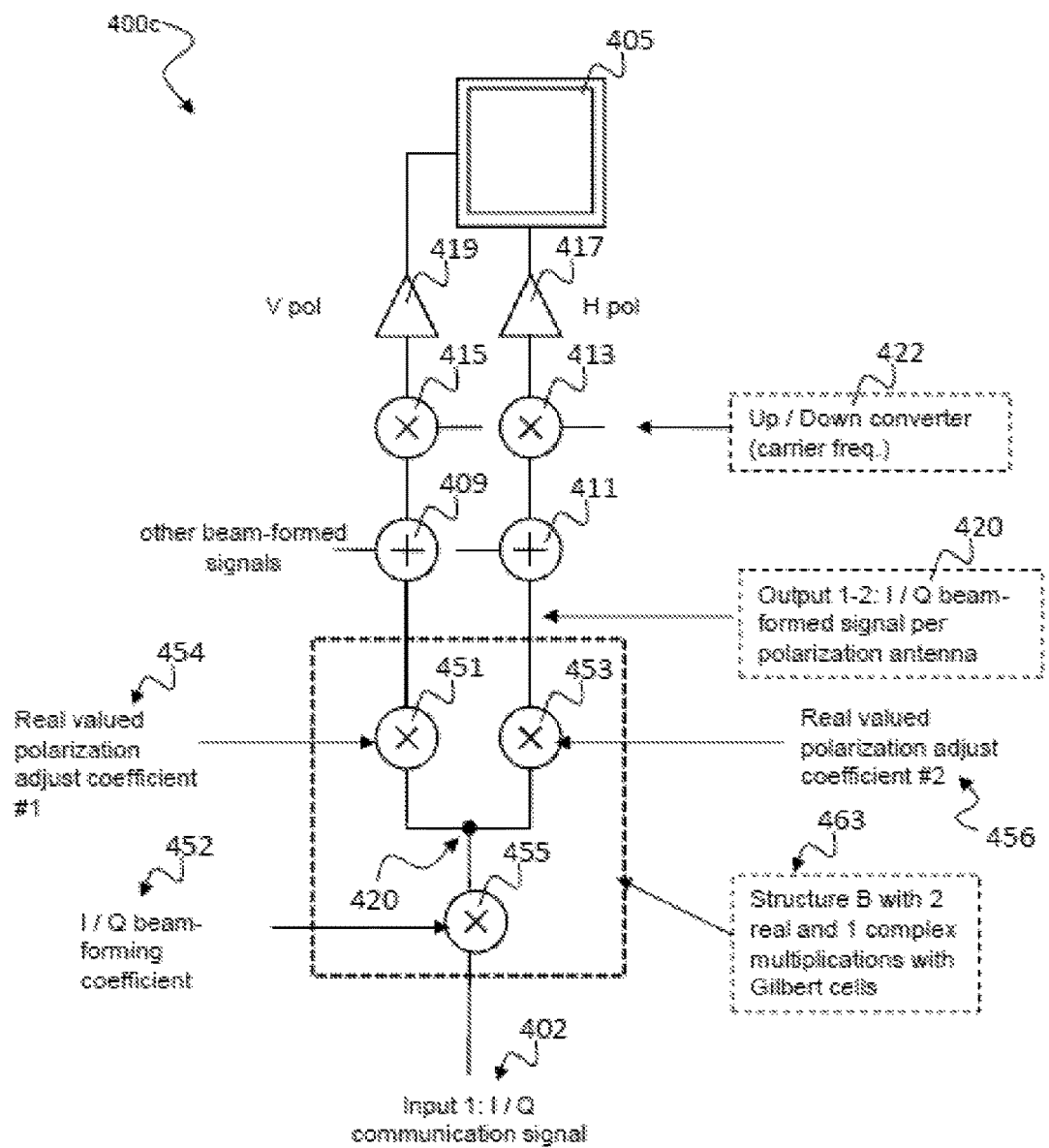
FIG. 4c shows a block diagram illustrating an analog beamforming transmitter 400c according to a further implementation form.

FIG. 4c shows a block diagram illustrating an analog beamforming transmitter 400c according to a further implementation form.

The analog beamforming transmitter 400c may correspond to the analog beamforming transmitter 400b described above with respect to FIG. 4b. However, the beamforming transmission circuits 463 of the transmitter 400c are differently implemented as the beamforming transmission circuits 403 of the transmitter 400b.

Each beamforming transmission circuit 463 includes an analog complex-valued multiplication circuit 455 configured to multiply the analog complex-valued communication signal with a complex-valued beamforming coefficient 452 to provide a beamformed analog complex-valued communication signal 420.

Each beamforming transmission circuit 463 includes a first analog multiplication circuit 451 configured to multiply the beamformed analog complex-valued communication signal 420 with a first analog real-valued beamforming coefficient 454 to provide the first polarization component 419. Each beamforming transmission circuit 463 further includes a second analog multiplication circuit 453 configured to multiply the beamformed analog complex-valued communication signal 420 with the second analog real-valued beamforming coefficient 456 to provide the second polarization component 417.

Figure 5A:
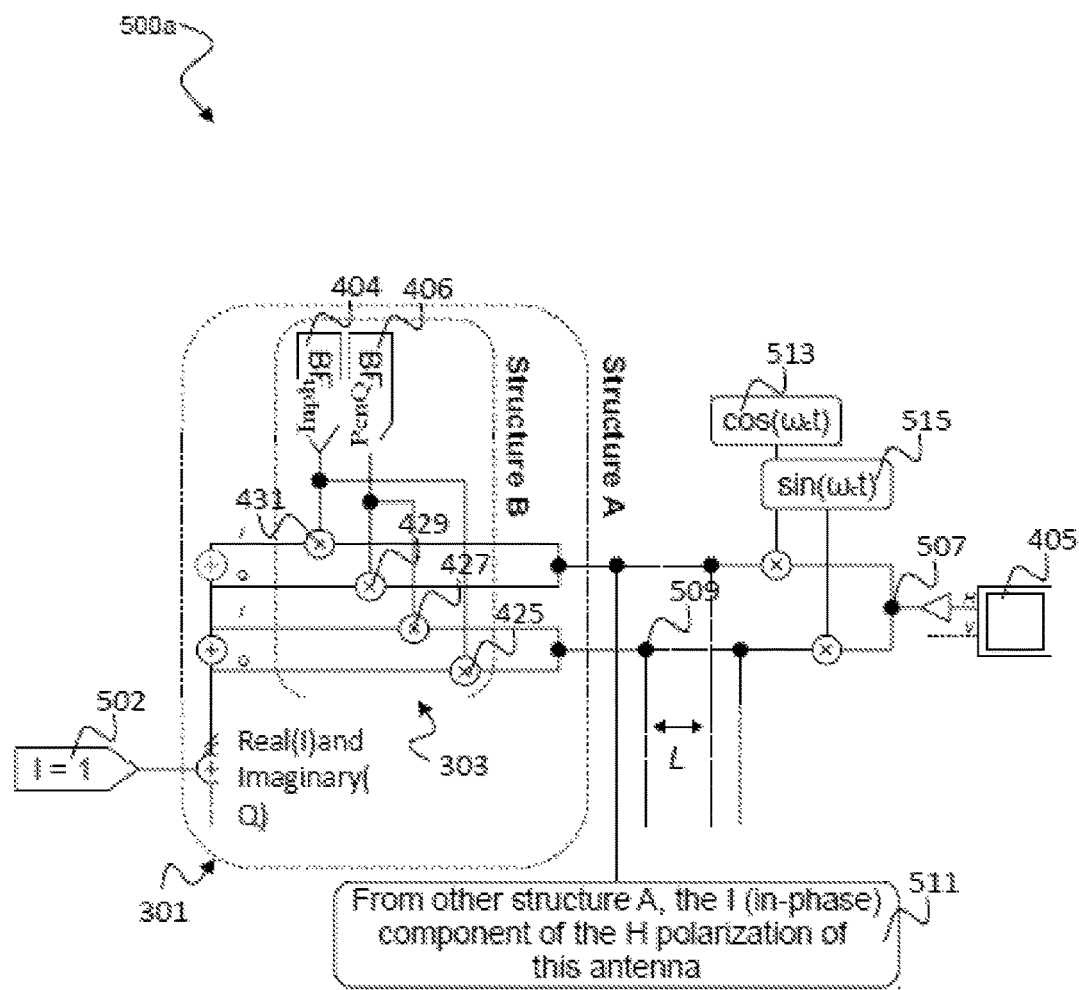
FIG. 5a shows a block diagram illustrating the RX architecture 500a of an analog beamformer according to an implementation form.

FIG. 5a shows a block diagram illustrating the RX architecture 500a of an analog beamformer according to an implementation form.

The RX architecture 500a includes a structure A 301 that is coupled between a respective antenna port 405 and a communication signal branch 502. The antenna signal of the antenna port 405 is provided to a down-converter 513, 515 for modulation with a carrier frequency and a signal combiner 509 for combining the antenna signal with antenna signals from other structures A 511 before it is provided to structure A 301.

Structure A 301 includes multiple structures B 303, each one corresponding to the description above with respect to FIG. 4a.

Figure 5B:
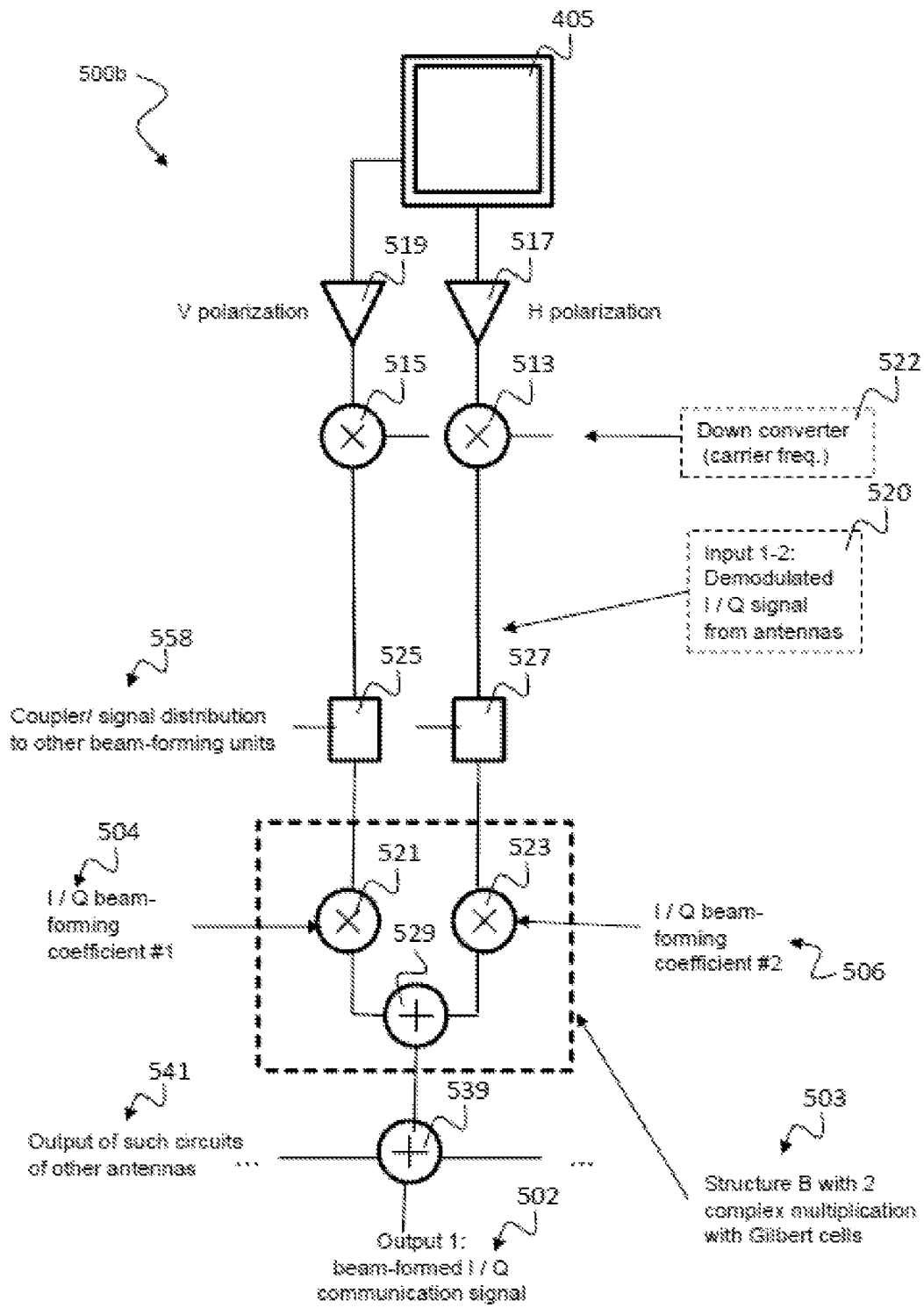
FIG. 5b shows a block diagram illustrating an analog beamforming receiver 500b according to an implementation form.

FIG. 5b shows a block diagram illustrating an analog beamforming receiver 500b according to an implementation form.

The analog beamforming receiver 500b includes a plurality of beamforming reception circuits 503 (also referred to as structure B circuit) connected in parallel between an array of antenna ports and a signal output 502. Each antenna port 405 of the array of antenna ports is configured to receive a dual-polarized antenna signal having a first polarization component 519 and a second polarization component 517. The signal output 502 is configured to provide an analog complex-valued communication signal having an in-phase and a quadrature component. Each beamforming reception circuit 503 is connected between a respective antenna port 405 of the array of antenna ports and the signal output 502. Each beamforming reception circuit 503 comprises a first coefficient input for receiving a first analog complex-valued beamforming coefficient 504 of a set of first analog complex-valued beamforming coefficients and a second coefficient input for receiving a second analog complex-valued beamforming coefficient 506 of a set of second analog complex-valued beamforming coefficients.

Each beamforming reception circuit 503 comprises a first analog complex-valued multiplication circuit 521 configured to multiply the first polarization component 519 of the dual polarized antenna signal at the respective antenna port 405 of the array of antenna ports with the first analog complex-valued beamforming coefficient 521 to provide a contribution to the analog complex-valued communication signal at the signal output 502.

Each beamforming reception circuit 503 comprises a second analog complex-valued multiplication circuit 523 configured to multiply the second polarization component 517 of the dual polarized antenna signal at the respective antenna port 405 of the array of antenna ports with the second analog complex-valued beamforming coefficient 506 to provide a contribution to the analog complex-valued communication signal at the signal output 502.

A down converter 515, 513 may be coupled between the antenna port 405 and the plurality of beamforming reception circuits 503 to down-convert the first polarization component 519 and the second polarization component 517 of the antenna signal from a carrier frequency to an intermediate or baseband frequency.

A combiner, e.g. an adder 539, may be coupled to the output of each beamforming reception circuit 503 for combining, i.e. adding, RX signals from other (different) antennas 541.

A signal distribution unit 525, 527 may be coupled between the antenna port 405 and the plurality of beamforming reception circuits 503 to distribute the first polarization component 519 and the second polarization component 517 of the antenna signal to other beamforming reception circuits.

The analog beamforming receiver 500b may include a modulation circuitry, e.g. as described below with respect to FIGS. 12a to 12d, to modulate the first analog complex-valued beamforming coefficient 521 and the second analog complex-valued beamforming coefficient 523 based on a Doppler shift corresponding to a beam formed by the first and second analog complex-valued beamforming coefficients 521, 523.

The modulation circuitry may modulate the first analog complex-valued beamforming coefficient 521 and the second analog complex-valued beamforming coefficient 523 to a frequency that has the negated value of the Doppler shift corresponding to the concerned beam.

Each beamforming reception circuit 503 may include a mixer, e.g. as described below with respect to FIGS. 12a to 12d, to mix the contributions to the analog complex-valued communication signal provided by the first and second analog complex-valued multiplication circuits 521, 523 with a Doppler shift compensation frequency to provide a Doppler shift compensated contribution to the analog complex-valued communication signal at the signal output 502.

Each beamforming reception circuit 503 may include a delay line, e.g. as described below with respect to FIG. 11, to delay the contribution to the analog complex-valued communication signal at the signal output with a time delay to provide a delay compensated contribution to the analog complex-valued communication signal at the signal output 502.

The first and second analog complex-valued multiplication circuits 521, 523 may include one or more Gilbert cells. The Gilbert cells may be complex multiplication Gilbert cells that perform complex valued multiplication operation.

The first coefficient input and the second coefficient input may be coupled to a digital-to-analog converter or a shift-register circuit providing the first and second analog complex-valued beamforming coefficients 521, 523 that are computed in digital baseband processing.

The signal output 502 may be coupled to an analog-to-digital converter to provide a digital complex-valued communication signal, wherein a sampling rate of the analog-to-digital converter is greater than a sampling rate of the digital-to-analog converter that is used for converting coefficients.

The analog beamforming receiver 500b may further include an adder 529 to add the contributions to the analog complex-valued communication signal provided by the first and second analog complex-valued multiplication circuits 521, 523.

Figure 5C:
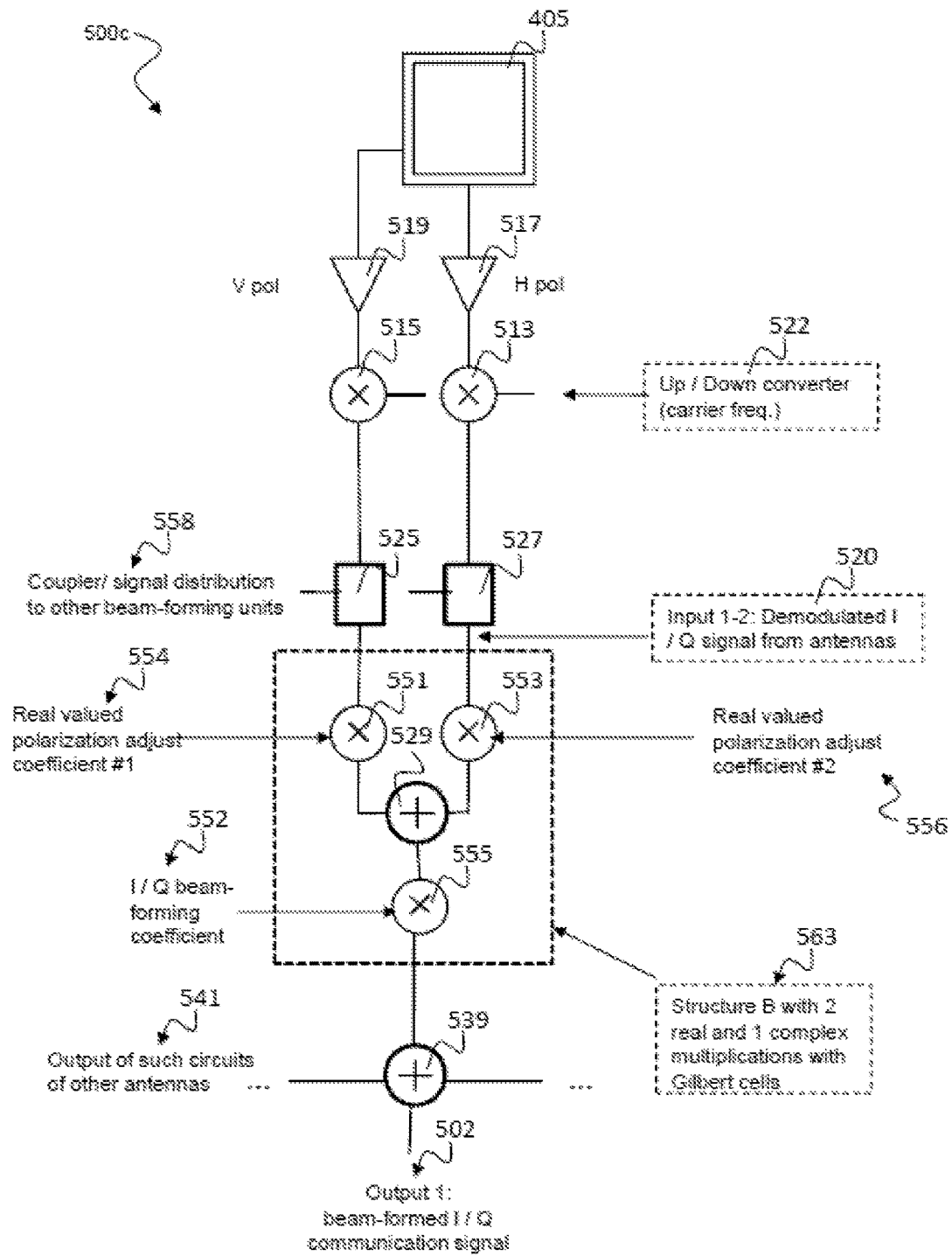
FIG. 5c shows a block diagram illustrating an analog beamforming receiver 500c according to a further implementation form.

FIG. 5c shows a block diagram illustrating an analog beamforming receiver 500c according to a further implementation form.

The analog beamforming receiver 500c may correspond to the analog beamforming receiver 500b described above with respect to FIG. 5b. However, the beamforming reception circuits 563 of the receiver 500c are differently implemented as the beamforming reception circuits 503 of the receiver 500b.

Each beamforming reception circuit 563 comprises a first analog multiplication circuit 551 to multiply the first polarization component 519 of the dual polarized antenna signal at the respective antenna port 405 of the array of antenna ports with a first analog real-valued polarization adjustment coefficient 554 to provide a contribution to the analog complex-valued communication signal.

Each beamforming reception circuit 563 comprises a second analog multiplication circuit 553 to multiply the second polarization component 517 of the dual polarized antenna signal at the respective antenna port 405 of the array of antenna ports with a second analog real-valued polarization adjustment coefficient 556 to provide a contribution to the analog complex-valued communication signal.

The outputs of the first and second analog multiplication circuits 551, 553 are added by an adder 529 and provided to a complex-valued analog multiplication circuit 555 for multiplication with a complex-valued beamforming coefficient 552. The output of this complex-valued analog multiplication circuit 555 corresponds to the signal output 502 of the analog beamforming receiver 500c.

Figure 6:
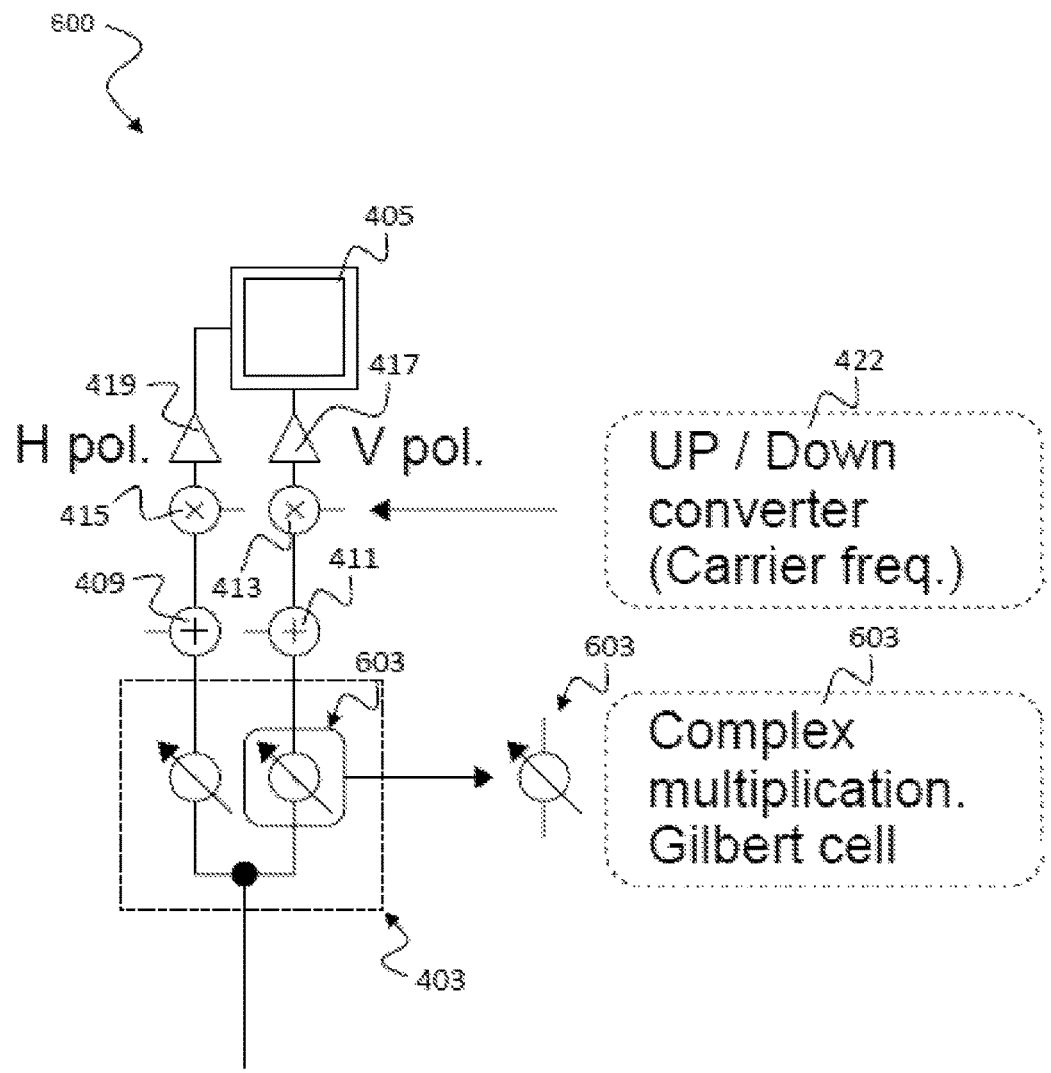
FIG. 6 shows a block diagram illustrating circuit structure B for analog beamforming 600 according to a first implementation form.

FIG. 6 shows a block diagram illustrating circuit structure B for analog beamforming 600 according to a first implementation form (Implementation 1).

Implementation 1 realizes multiplications with Gilbert cells 603, for example 1 cell per real multiplication and 4 cells per complex multiplication. A Complex multiplication is applied for Power and phase allocation of the beam, Beam-steering (phase and amplitude adjustment of the signal) and Polarization adjustment.

Eight Gilbert cells per dual polarized antenna may be required for this type of implementation. Four DACs per structure B 403 may be required for the control signal.

Figure 7:
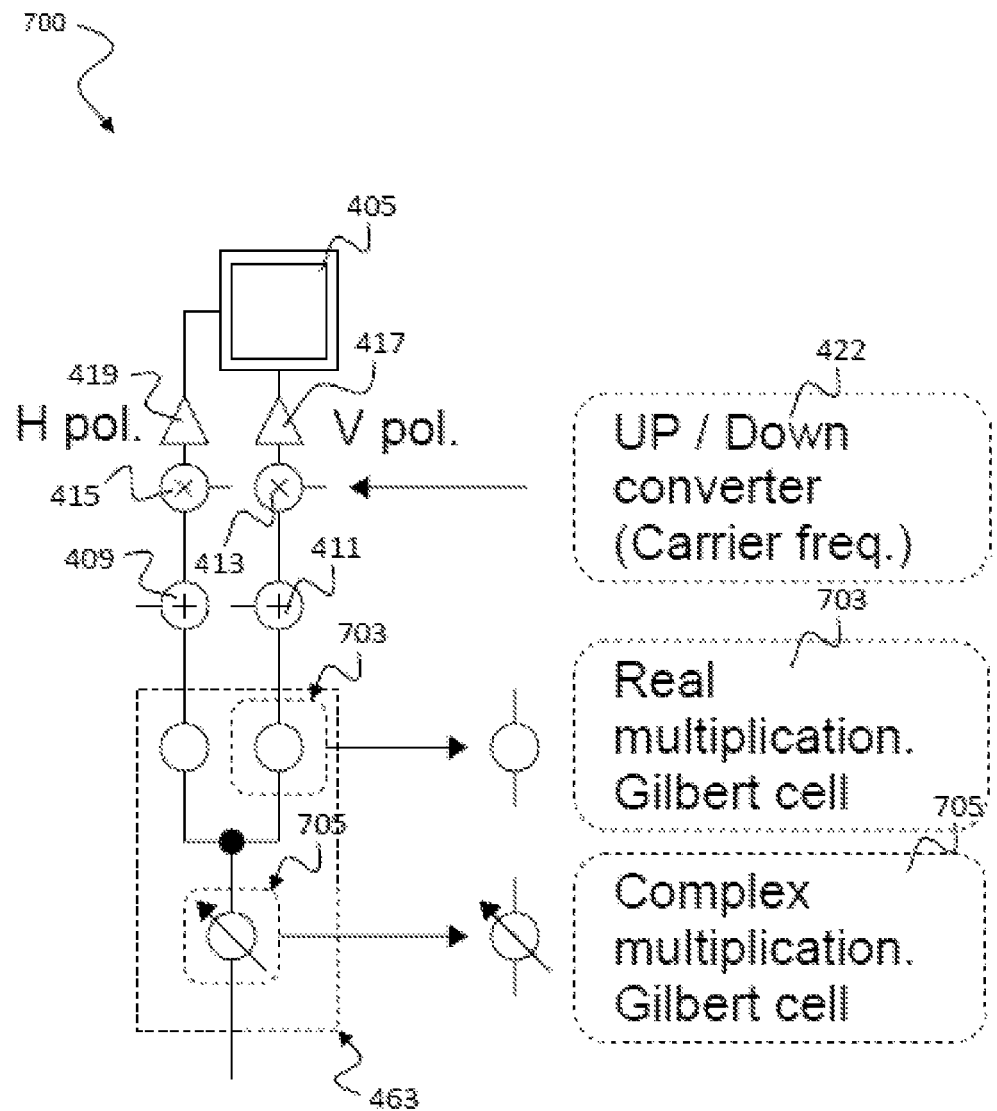
FIG. 7 shows a block diagram illustrating circuit structure B for analog beamforming 700 according to a second implementation form.

FIG. 7 shows a block diagram illustrating circuit structure B for analog beamforming 700 according to a second implementation form (Implementation 2).

Implementation 2 realizes multiplications with Gilbert cells, for example a real multiplication 703 for polarization adjustment; and a complex multiplication 705 for power allocation of the beam and beam-steering (phase and amplitude adjustment of the signal).

Depending on the antenna array characteristics, there are two variants for the implementation 2: Variant 1 uses shift variant arrays; Variant 2 uses shift invariant arrays (e.g. planar arrays). This is a more efficient implementation in terms of Gilbert cells since only 6 Gilbert cells and 4 DACs for the control signals may be required per structure B. The variant 2 of the implementation 2 assumes that V and H characteristics remain the same along the array. In that case, control DACs can be saved since the polarization coefficients are the same for all the antennas inside the structure A. In total, only $2N_{BS}+2$ DACs and $6N_{BS}$ Gilbert cells are required for the control signals per structure A.

The digital to analog converter (DAC) requirements may be different depending on the type of signal. For communication signals high speed DACs may be required. On the other side, control signals can be generated with low speed DACs, since the change of the coefficients is slower compared to the communication signal.

Two DACs may be required to generate each complex beamformer coefficient. Simplifications considering the polarization of the antennas can lead to a reduced number of DACs (e.g. for Implementation 2, variant 2).

The coefficients of the beamformer may be calculated in the digital domain and applied in the analog domain in order to simplify the digital operations and number of DACs for communication signals. The multiplication of the coefficients with the communication signals may be performed completely in the analog domain using Gilbert cells. Four Gilbert cells may be needed for each complex multiplication, and one for each real multiplication.

Table 1 illustrates the number of DAC and Gilbert cells required for the different implementation alternatives, where $N_{BS}$ is the number of antenna ports and L the number of implemented delays.

TABLE 1 number of DAC and Gilbert cells required for the different implementation alternatives.

| Component | Implementation 1 | Structure B Implementation 2 Variant 1 | Variant 2 |
|---|---|---|---|
| Communication ADC/DAC | L | L | L |
| Control DAC | $4LN_{BS}$ | $4LN_{BS}$ | $L(2N_{BS} + 2)$ |
| Gilbert Cells | $8LN_{BS}$ | $6LN_{BS}$ | $6LN_{BS}$ |

Figure 8:
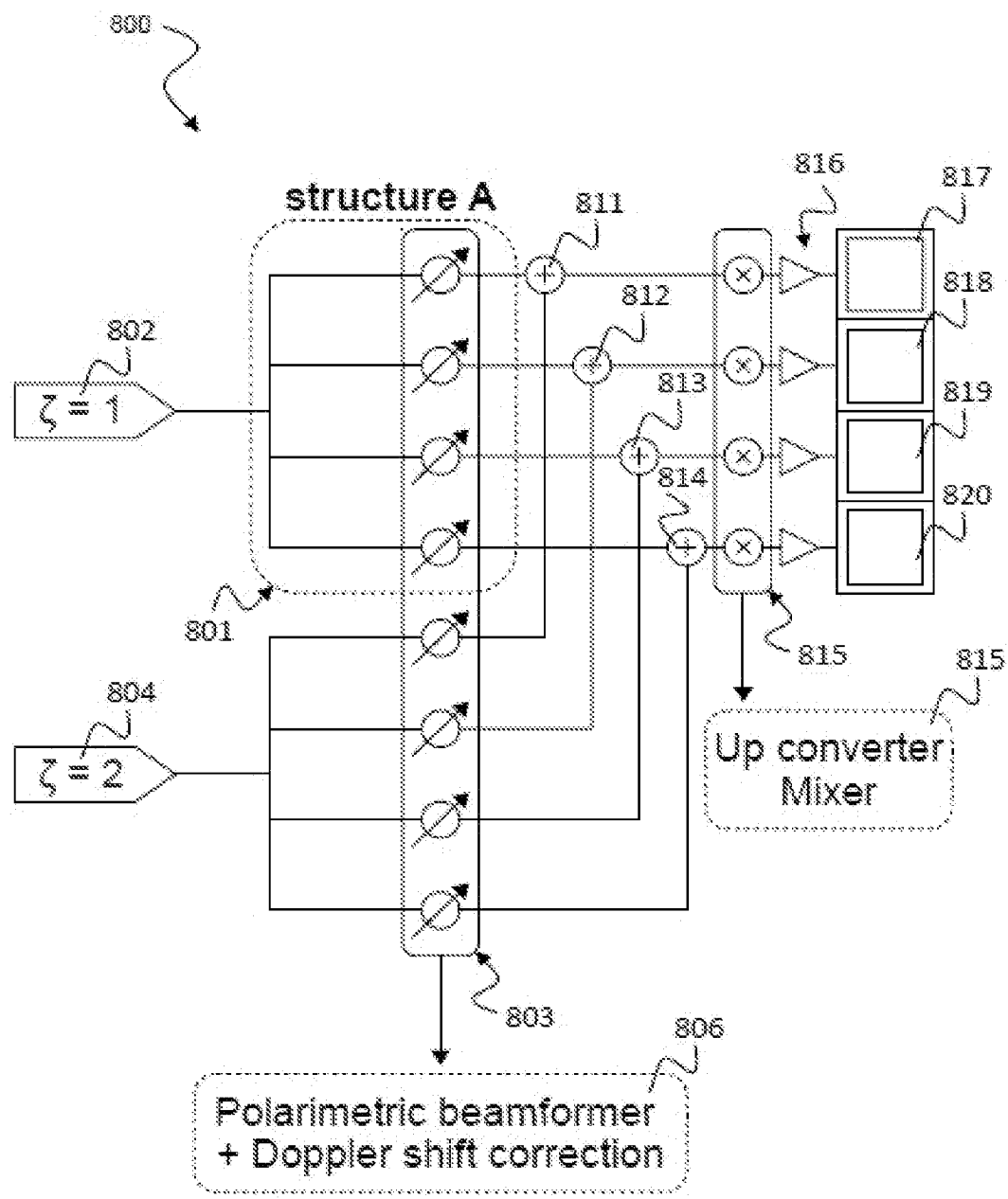
FIG. 8 shows a block diagram illustrating Doppler shift compensation within a beamforming device 800 according to an implementation form.

FIG. 8 shows a block diagram illustrating Doppler shift compensation within a beamforming device 800 according to an implementation form.

A polarimetric beamformer and Doppler shift correction circuit 803 is implemented within a structure A 801, e.g. a structure A 301 as described above with respect to FIGS. 3, 4*a* and 5*a*. The coefficients of the polarimetric beamformer and Doppler shift correction circuit 803 are applied to the structure A 801 signals of a first communication signal branch 802 and a second communication signal branch 804 to provide polarimetric beamforming and Doppler shift correction. Output signals of both structures A 801 are added by respective adders 811, 812, 813, 814 and provided to an up converter mixer 815, a driving stage 816 and finally to the respective antenna elements 817, 818, 819, 820.

$\zeta=1$ and $\zeta=2$ represent two different DACs 802, 804 of communication signal branches. No polarization, only 2 delay taps and 4 antenna elements are shown for simplicity.

The compensation of the Doppler shift in the previously introduced architectures assumes that it is performed within the beamformer. The beamformer coefficients become time-varying at the Doppler frequency. However, the maximum Doppler shift still needs a low speed DAC for the coefficients. This is the most efficient implementation in terms of number of components.

Figure 9:
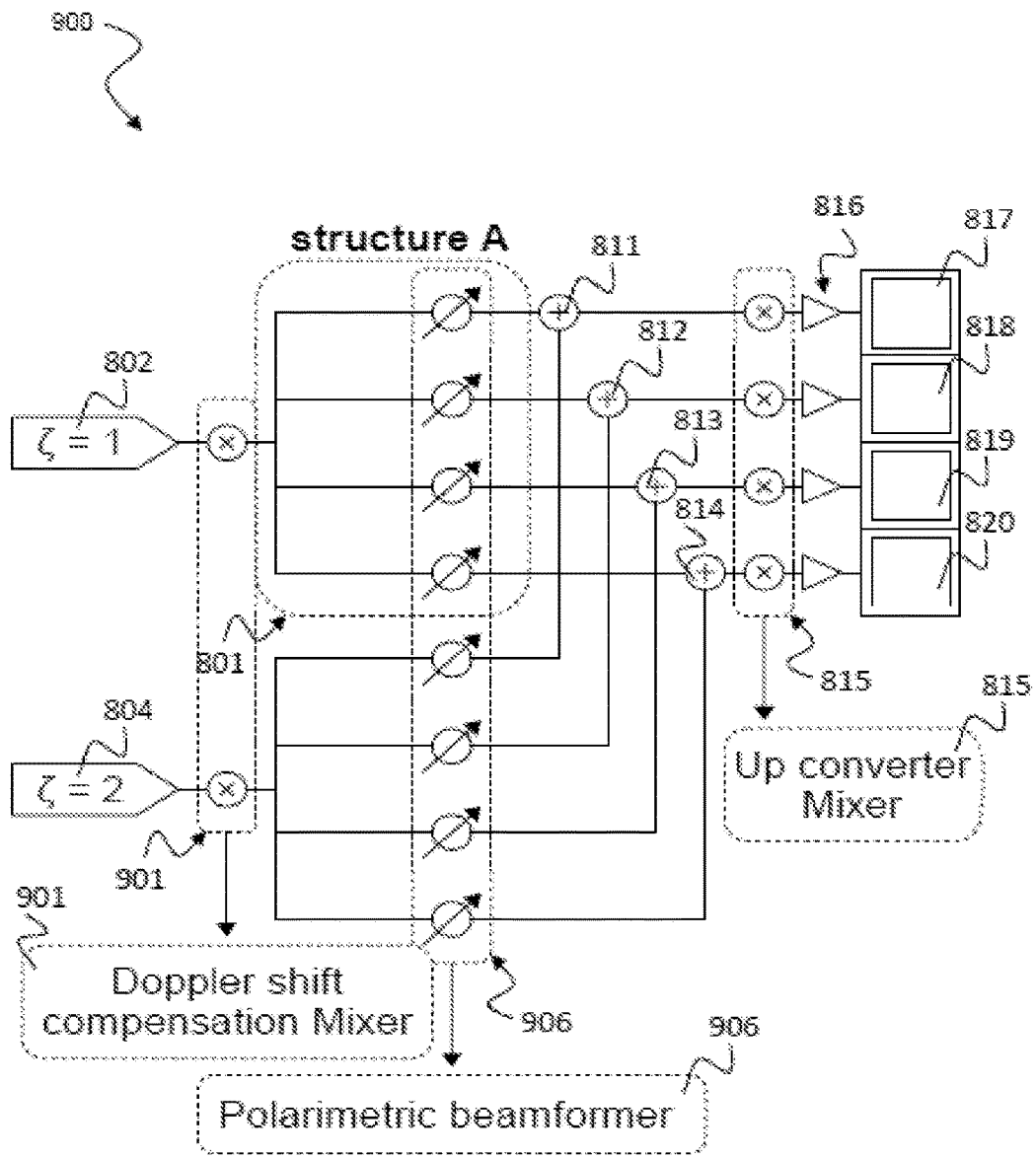
FIG. 9 shows a block diagram illustrating a beamforming device 900 with a separated Doppler shift compensation according to a first implementation form.

FIG. 9 shows a block diagram illustrating a beamforming device 900 with a separated Doppler shift compensation according to a first implementation form.

The structure of the device 900 corresponds to the structure of the device 800. However, Instead of the polarimetric beamformer and Doppler shift correction circuit 803 inside structure A 801, a polorimetric beamformer device 906 without Doppler shift correction is realized within structures A 801. For Doppler shift correction, a Doppler shift compensation mixer circuit 901 is implemented outside the structures A 801. The two communication signals from the first and second communication signal branches 802, 804 pass the Doppler shift compensation mixer circuit 901 for compensation of Doppler shift before entering the structures A 801, where polarimetric beamforming is performed.

Compensation is performed with mixers 901 per delay tap. No polarization, only 2 delay taps and 4 antenna elements are shown for simplicity.

The alternative implementation of FIG. 9 is using mixers 901 for the Doppler compensation for each delay tap. The disadvantage of this implementation is the increasing amount of components: 1 mixer and 1 more DAC per delay tap may be required. Furthermore, covering channel cases II and III according to FIG. 1 may be limited with this implementation, since this implementation may limit each delay tap to a single Doppler shift compensation.

Figure 10:
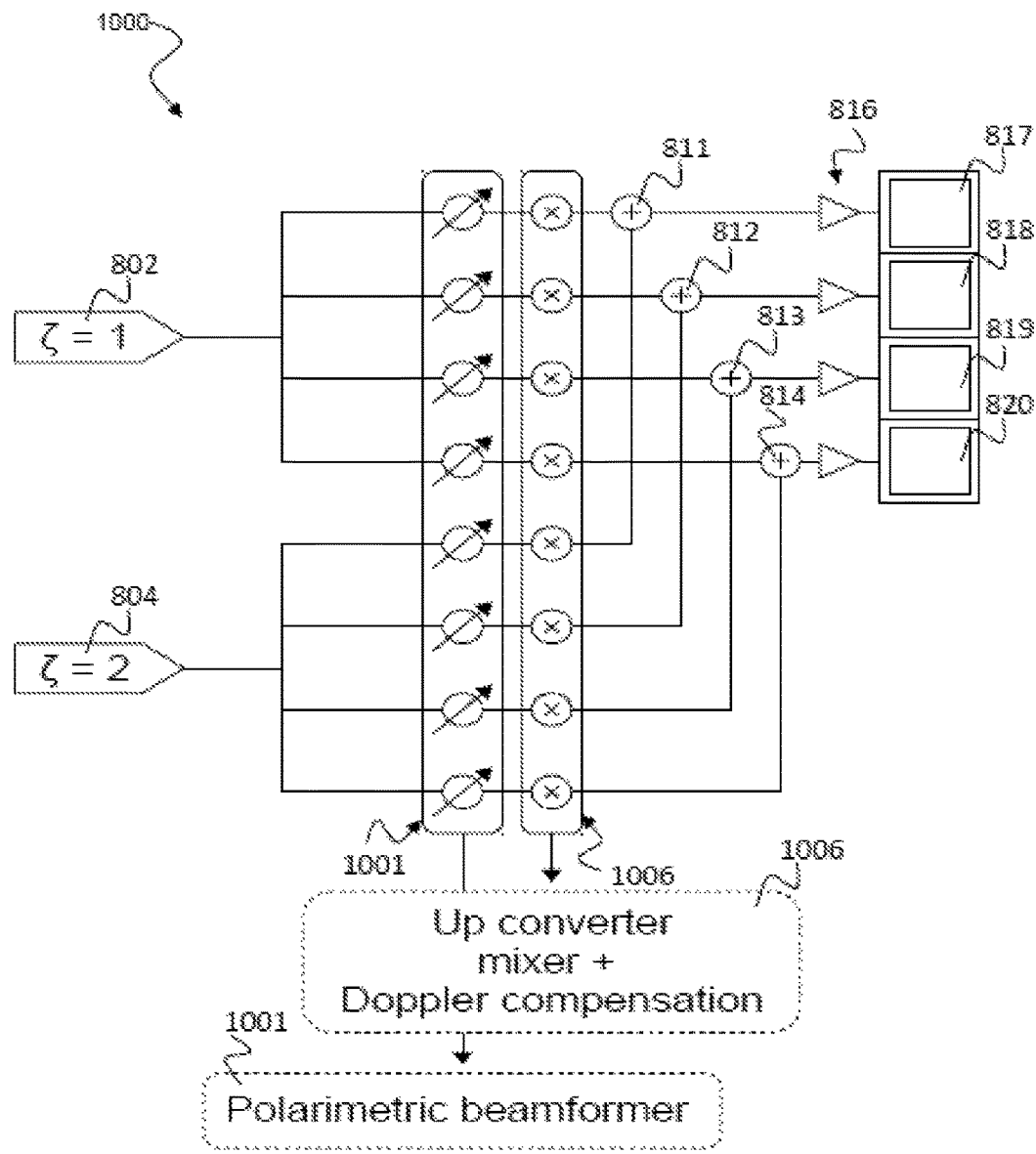
FIG. 10 shows a block diagram illustrating Doppler shift compensation separated from the beamforming device 1000 according to a second implementation form.

FIG. 10 shows a block diagram illustrating Doppler shift compensation separated from the beamforming device 1000 according to a second implementation form.

Compensation 1001 is performed together with the up/down conversion stage 1006. No polarization, only 2 delay taps and 4 antenna elements are shown for simplicity.

However, with the last implementation alternative, the number of high frequency mixers becomes equal to the number of antenna ports, resulting in a very expensive and challenging implementation.

Figure 11:
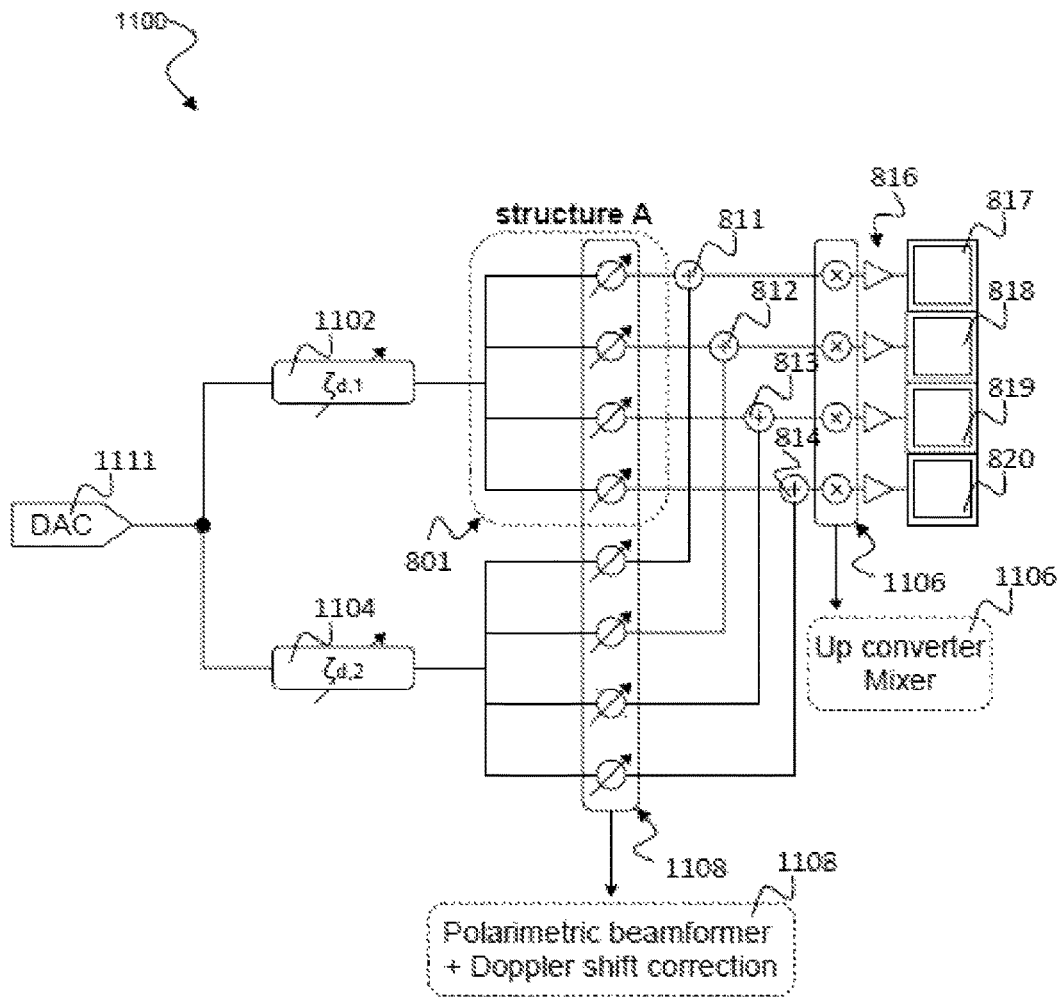
FIG. 11 shows a block diagram illustrating the TX architecture of an analog delay compensation device 1100 according to an implementation form.

FIG. 11 shows a block diagram illustrating the TX architecture of an analog delay compensation device 1100 according to an implementation form.

The device 1100 correspond to the device 800 in which the up-converter mixer circuit 815 is realized together with the polarimetric beamforming and Doppler shift correction circuit 803 in the structures A 801.

Delay lines for delay compensation (time-reversal) are used. No polarization, only 2 delay taps and 4 antenna elements are shown for simplicity.

The delay compensation can be performed digitally and analog. In the digital case, a digital interface (DAC/ADC) may be used per delay tap. In the analog case, a digital interface with different delay lines may be used to achieve the different delays.

The analog implementation of the delay compensation may include the use of adaptable delay lines. In the up-link case, the output of each structure A 801 is connected to a delay line with a different length proportional to the delay to compensate. The outputs of the delay line are summed in the input to the single decoder. In the down-link case, a single encoder originates the stream that is delayed by the different delay lines, whose outputs are connected to the structures A 801.

Figure 12A:
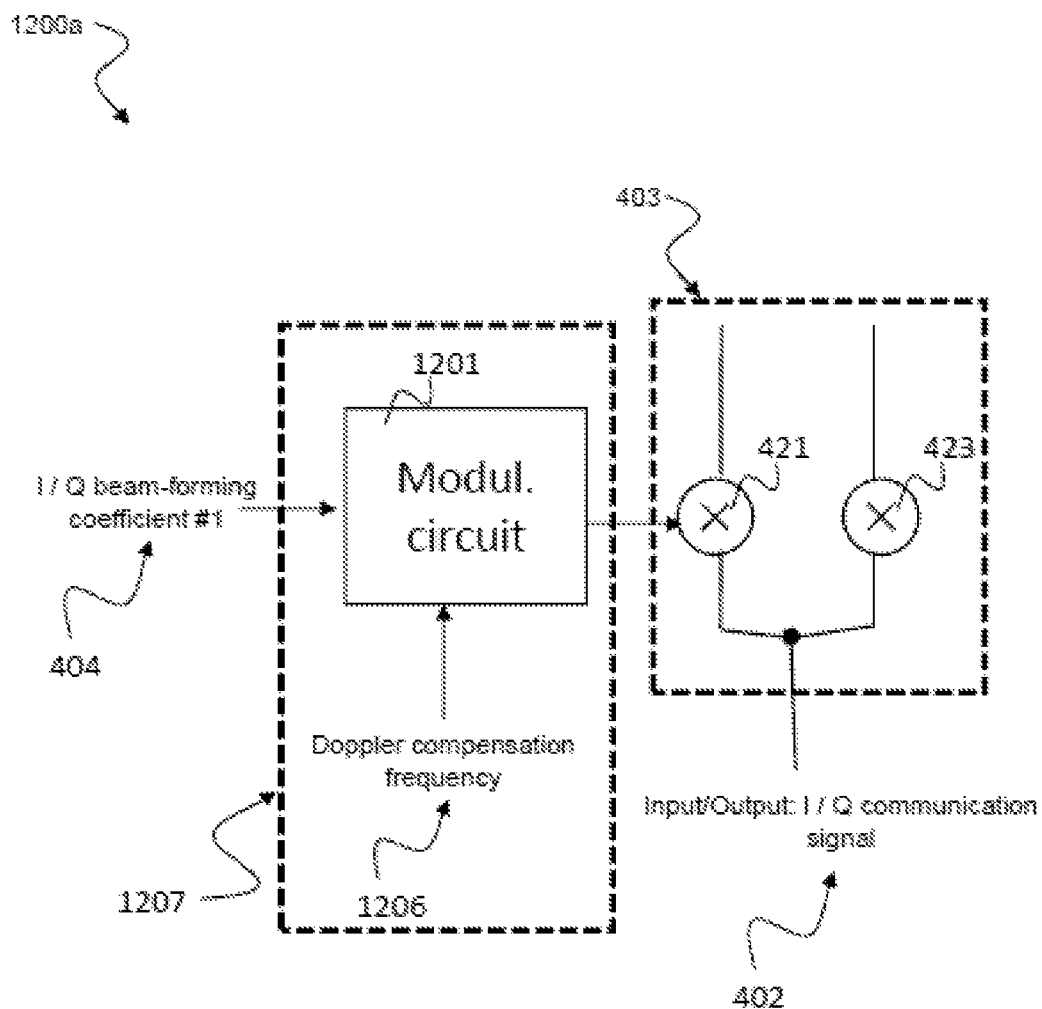
FIG. 12a shows a block diagram illustrating an analog beamforming device 1200a including a circuit structure B 403 and a Doppler compensation circuit 1207 according to a first implementation form.

FIG. 12*a* shows a block diagram illustrating an analog beamforming device 1200*a* including a circuit structure B 403 and a Doppler compensation circuit 1207 according to a first implementation form.

The circuit structure B 403 may correspond to the circuit structure B 403 as described above with respect to FIG. 4*b*. The Doppler compensation circuit 1207 is coupled between the first coefficient input of structure B 403 for receiving the first beamforming coefficient 404 and the first multiplier 421 of structure B. the Doppler compensation circuit 1207 includes a modulation circuit 1201 for modulating the first beam-forming coefficient 404 with a Doppler compensation frequency 1206 prior to providing the first beam-forming coefficient 404 to the first multiplier 421.

A second such Doppler compensation circuit 1207 (not shown in FIG. 12*a*) may be coupled between the second coefficient input of structure B 403 for receiving the second beamforming coefficient and the second multiplier 423 of structure B.

The Doppler compensation circuit 1207 may also be implemented together with the structures B 403 in the RX beamformers as described above with respect to FIGS. 5*b* and 5*c*.

Figure 12B:
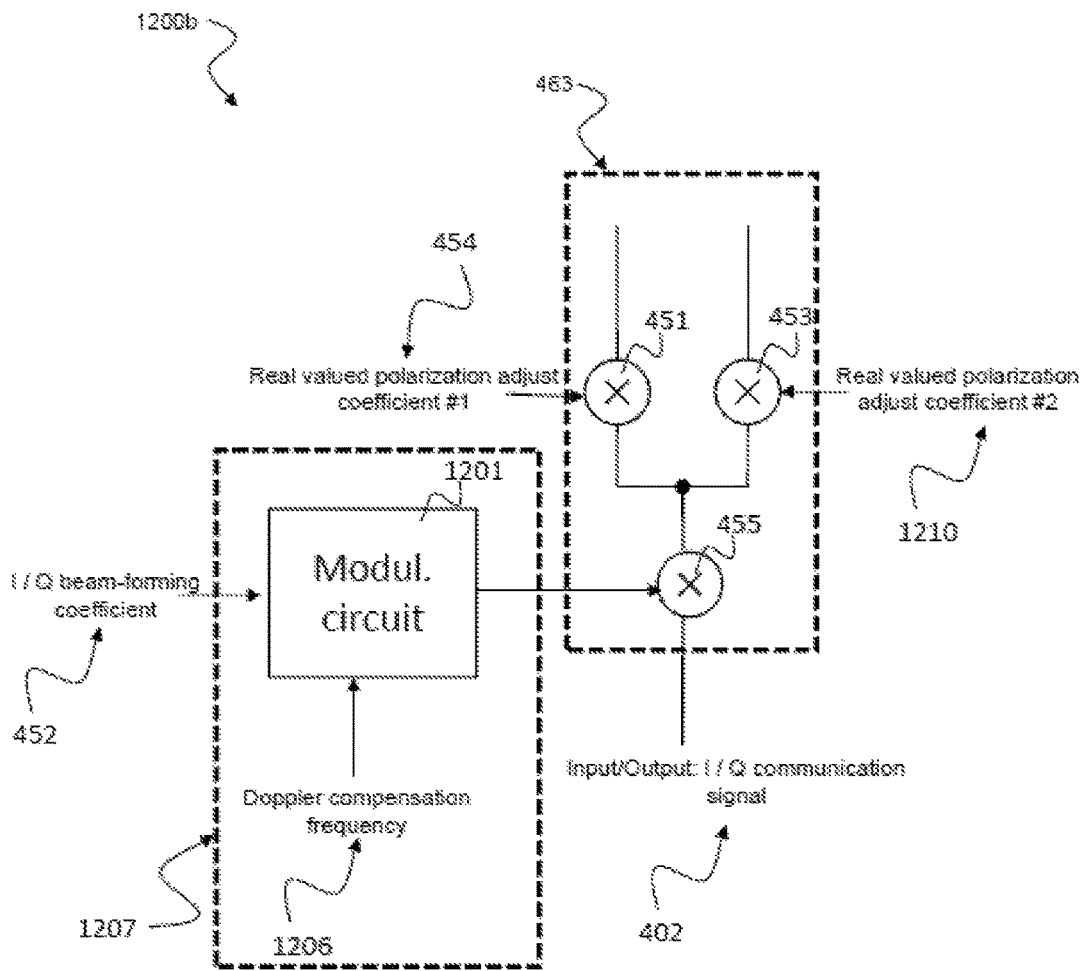
FIG. 12b shows a block diagram illustrating an analog beamforming device 1200b including a circuit structure B 463 and a Doppler compensation circuit 1207 according to a second implementation form.

FIG. 12*b* shows a block diagram illustrating an analog beamforming device 1200*b* including a circuit structure B 463 and a Doppler compensation circuit 1207 according to a second implementation form.

The circuit structure B 463 may correspond to the circuit structure B 463 as described above with respect to FIG. 4*c*. The Doppler compensation circuit 1207 may correspond to the Doppler compensation circuit 1207 as described above with respect to FIG. 12*a*. The Doppler compensation circuit 1207 is coupled between the coefficient input of structure B 463 for receiving the beamforming coefficient 452 and the complex-valued multiplier 455 of structure B. the Doppler compensation circuit 1207 includes a modulation circuit 1201 for modulating the beam-forming coefficient 452 with a Doppler compensation frequency 1206 prior to providing the beam-forming coefficient 452 to the complex-valued multiplier 455.

The Doppler compensation circuit 1207 may also be implemented together with the structures B 463 in the RX beamformers as described above with respect to FIGS. 5*b* and 5*c*.

Figure 12C:
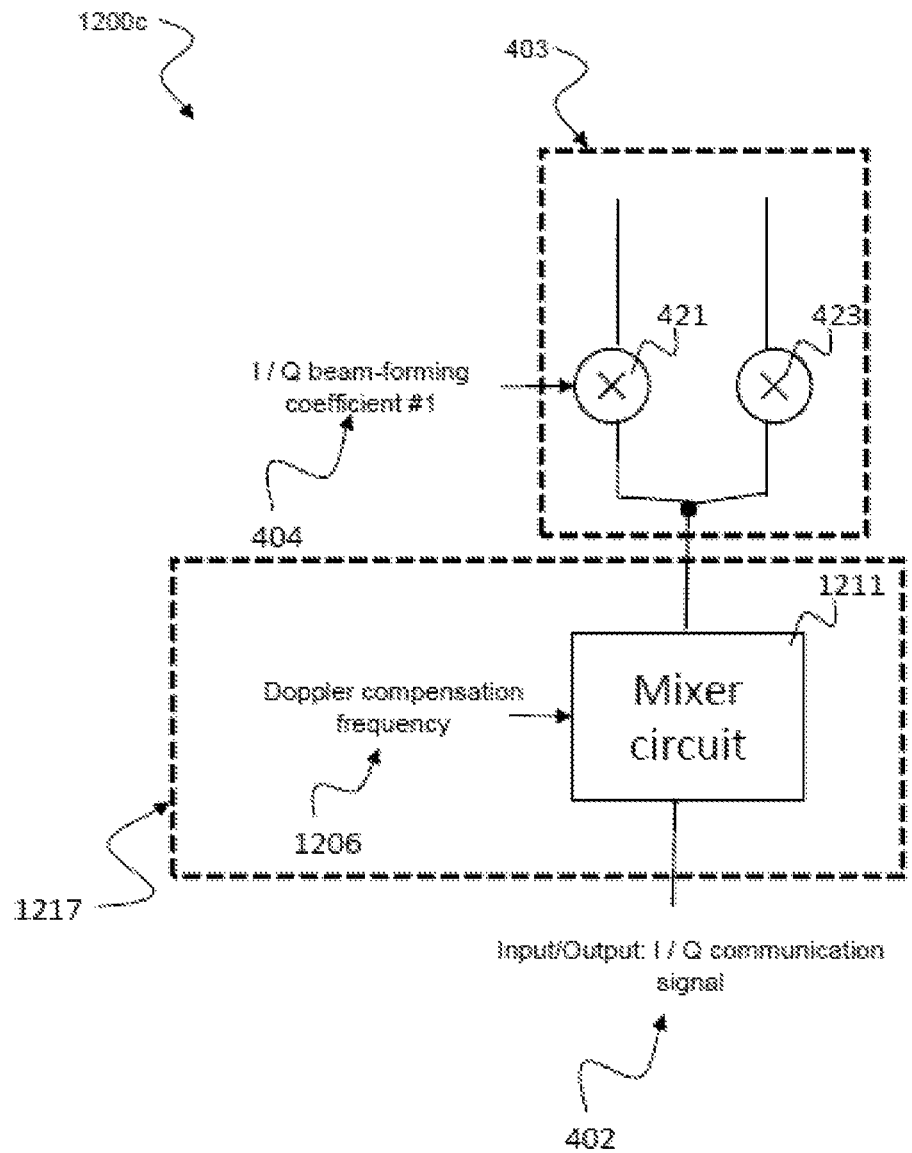
FIG. 12c shows a block diagram illustrating an analog beamforming device 1200c including a circuit structure B 403 and a Doppler compensation circuit 1217 according to a third implementation form.

FIG. 12*c* shows a block diagram illustrating an analog beamforming device 1200*c* including a circuit structure B 403 and a Doppler compensation circuit 1217 according to a third implementation form.

The circuit structure B 403 may correspond to the circuit structure B 403 as described above with respect to FIG. 4*b*. The Doppler compensation circuit 1217 is coupled between the communication coefficient input of structure B 403 for receiving the complex communication signal 402 and the input of the first and second multipliers 421, 423 of structure B. The Doppler compensation circuit 1217 includes a mixer circuit 1211 for mixing the complex communication signal 402 with a Doppler compensation frequency 1206 prior to providing the complex communication signal 402 to the first and second multipliers 421, 423.

The Doppler compensation circuit 1217 may also be implemented together with the structures B 403 in the RX beamformers as described above with respect to FIGS. 5*b* and 5*c*.

Figure 12D:
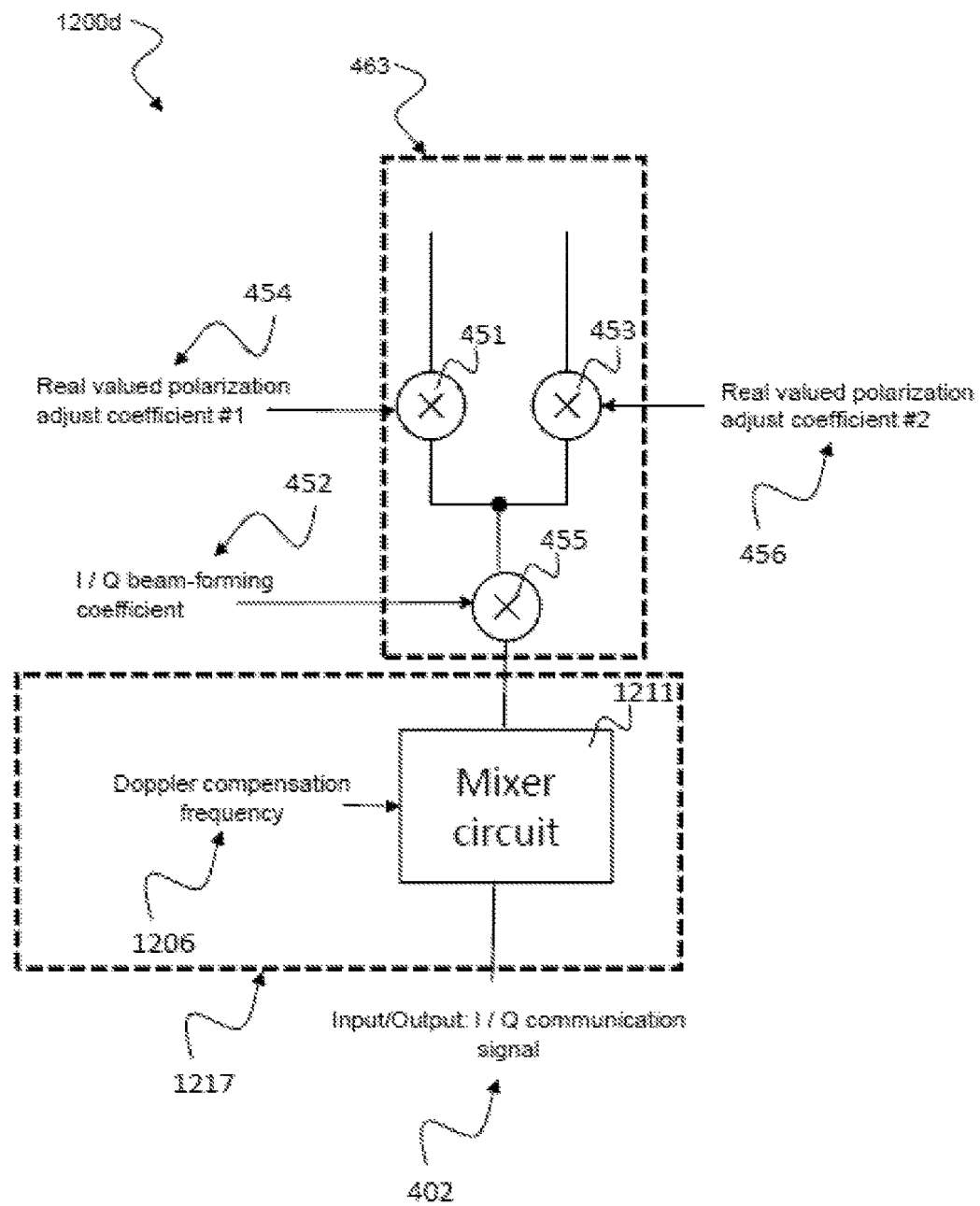
FIG. 12d shows a block diagram illustrating an analog beamforming device 1200d including a circuit structure B 463 and a Doppler compensation circuit 1217 according to a fourth implementation form.

FIG. 12*d* shows a block diagram illustrating an analog beamforming device 1200*d* including a circuit structure B 463 and a Doppler compensation circuit 1217 according to a fourth implementation form.

The circuit structure B 463 may correspond to the circuit structure B 463 as described above with respect to FIG. 4*c*. The Doppler compensation circuit 1217 may correspond to the Doppler compensation circuit 1217 as described above with respect to FIG. 12*c*. The Doppler compensation circuit 1217 is coupled between the communication signal input of structure B 463 for receiving the complex communication signal 402 and the input of the complex-valued multiplier 455 of structure B. The Doppler compensation circuit 1217 includes a mixer circuit 1211 for mixing the complex communication signal 402 with a Doppler compensation frequency 1206 prior to providing the complex communication signal 402 to the complex-valued multiplier 455.

The Doppler compensation circuit 1217 may also be implemented together with the structures B 463 in the RX beamformers as described above with respect to FIGS. 5*b* and 5*c*.

The Doppler compensation circuits 1207 and 1217 as described above with respect to FIGS. 12*a* to 12*d* may also be referred to as Doppler shift units, i.e. they provide Doppler shift compensation based on mixing the communication signal 402 with respect to the Doppler compensation frequency 1206 or based on modulation of the beamforming coefficients with respect to the Doppler compensation frequency 1206. In particular, such a Doppler shift unit may be either based on a modulation circuit 1201 or alternatively based on a mixer circuit 1211.

The devices as described above with respect to FIGS. 3 to 12*d* may also be applied in the case of polarization adjustment with/or without doing beamforming in baseband. In such a case, instead of the beamforming coefficients or additionally to the beamforming coefficients as described above, polarization adjustment coefficients may be provided. Such devices are described above in the summary section regarding the third and fourth aspect of the invention and corresponding implementation forms.

The devices as described above with respect to FIGS. 3 to 12*d* may also be applied in the case of Doppler shift compensation with/or without doing beamforming in baseband. In such a case, instead of the beamforming coefficients or additionally to the beamforming coefficients as described above, Doppler shift compensation coefficients may be provided. Such devices are described above in the summary section regarding the fifth and sixth aspect of the invention and corresponding implementation forms.

The devices as described above with respect to FIGS. 3 to 12*d* may also be applied in the case of delay compensation with/or without doing beamforming in baseband. In such a case, instead of the beamforming coefficients or additionally to the beamforming coefficients as described above, delay compensation coefficients may be provided. Such devices are described above in the summary section regarding the seventh and eighth aspect of the invention and corresponding implementation forms.

The signal distribution units 525, 527 as described above with respect to FIGS. 5*b* and 5*c* may form an antenna arrangement for beamforming. Such antenna arrangement includes a plurality of beamforming reception circuits connected in parallel between an antenna port and a signal output, wherein the antenna port is configured to receive a dual-polarized antenna signal having a first polarization component and a second polarization component and wherein each beamforming reception circuit is configured to beamform the antenna signal; and a signal distribution unit coupled between the antenna port and the plurality of beamforming reception circuits and configured to distribute the dual-polarized antenna signal to the plurality of beamforming reception circuits.

The signal distribution units 525, 527 as described above with respect to FIGS. 5*b* and 5*c* may form an antenna arrangement for polarization adjustment with or without doing beamforming in baseband. Such antenna arrangement includes a plurality of polarization adjustment reception circuits connected in parallel between an antenna port and a signal output, wherein the antenna port is configured to receive an antenna signal and wherein each polarization adjustment reception circuit is configured to provide a polarization adjustment of the antenna signal; and a signal distribution unit coupled between the antenna port and the plurality of polarization adjustment reception circuits and configured to distribute the antenna signal to the plurality of polarization adjustment reception circuits.

EXAMPLES

In the following section a channel estimation example, an example of beamforming according to the disclosure and an example of the mathematical representation of the beamformer structures according to the disclosure are described.

Example of Channel Estimation:

The beamforming scheme as described in this disclosure relies on the availability of channel information including the Angle of Departures (AoD), Angle of Arrivals (AoA), propagation delays and polarization change of the propagation paths.

First, to identify the available propagation paths (e.g. LOS path or reflection paths), the TX and RX can transmit and receive a pilot signal in all possible resolvable AoD's and AoA's, respectively, one after another. To estimate the change of polarization in each propagation path (joint effect of reflection and polarization mismatch between TX and RX), orthogonal pilot signals are transmitted in the two orthogonal polarized antennas (e.g. V and H) of the TX.

Second, those AoD and AoA pairs with received the pilot signal above a certain power level can be identified as those of the available propagation paths.

Third, from the known pilot signal and the received signal in each of such AoD and AoA pairs, the gain and phase of each propagation path can be estimated.

Fourth, from the two signals received from two orthogonal polarized antennas at the RX, the change of polarization in each path (corresponding to a pair of AoD and AoA) can be estimated. If the polarization is changed in this propagation path, each received signal (e.g. from the V polarized RX antenna) will be a linear combination of the two orthogonal pilot signals. For example, let us observe the pilot signal transmitted via V polarization of TX and received both via V and H polarizations of RX. From the ratio of such received signal power in V and H of RX and using the trigonometric equations, the relative change of the polarization angle of this signal can be calculated.

Example of Beamforming:

Assume that there are two paths between the BS and the UE: One Line of Sight (LOS) path and one reflection path. In the LOS path, the polarization of the transmitted signal does not change. In the reflection path, the polarization of the transmitted signal is rotated by 30°. Furthermore, the propagation delay in the second path is, for example, 10 ns more than that in the first path. The first path has complex gain a1, while the second path has complex gain a2. We further assume that the BS has a 8×8 antenna array (dual polarized) and the UE has a single omnidirectional antenna (dual polarized).

In the following, the downlink beamforming steps are described.

First, the channel estimation procedure as described above is carried out to obtain the AoDs, the complex valued path gains, the delays and the polarization changes of the two paths;

Second, the path gains of the two paths are compared with a predefined threshold. Both path gains are assumed to be above this threshold. Then, both paths are selected for beamforming.

Third, based on the AoDs and the specification of the 8×8 antenna array (e.g. inter-antenna element distance), two steering vectors are calculated in the BS, which point to the AoDs of the two propagation paths.

Fourth, the polarization of the signal to be transmitted in the second propagation path (using the second steering vector) is rotated by −30°, for example, to correct the polarization rotation in the second propagation path. This can be done by weighting the signals to the two orthogonally polarized TX antennas.

Fifth, the signal in the first propagation path is delayed by 10 ns before it is transmitted, so that it arrives at the UE at the same time as that in the second propagation path.

Sixth, the signal to the second propagation path is multiplied by the complex coefficient a1/a2.

Finally, after the above pre-processing at the base station (BS), the signals transmitted in both propagation paths will add coherently at the UE RX antenna.

Example of the mathematical representation of the beamformer structures:

The following channel representation and be used:

The uplink baseband complex channel impulse response at the $n_{BS}^{th}$ antenna can be written as:

$$h_n(t, \tau, \phi_{RX}, \theta_{RX}) = \sum_{l=1}^{L} \sum_{i=1}^{I} c_{l,i} e^{-i2\pi f_{l,i}^D t} \delta(\tau - \tau_l) \delta(\phi_{RX} - \phi_{RX,l,i}) \delta(\theta_{RX} - \theta_{RX,l,i})$$

where:

$n^{th}$ antenna

L is the number of delays

I is the number of impinging waves per delay $c_{l,i}$ is complex channel coefficient of the $i^{th}$ ray in the $l^{th}$ delay bin $f_{l,i}^D$ is the Doppler frequency shift of the $i^{th}$ ray in the $l^{th}$ delay bin $\tau_l$ is the $l^{th}$ delay bin $\phi_{RX,l,i}$ represents the azimuth of arrival of the of the $i^{th}$ ray in the $l^{th}$ delay bin $\theta_{RX,l,i}$ presents the elevation of arrival of the of the $i^{th}$ ray in the $l^{th}$ delay bin In the down-link case, the channel can be described as $$h_n(t, \tau, \phi_{TX}, \theta_{TX}) = \sum_{l=1}^{L} \sum_{i=1}^{I} c_{l,i} e^{-i2\pi f_{l,i}^D t} \delta(\tau - \tau_l) \delta(\phi_{TX} - \phi_{TX,l,i}) \delta(\theta_{TX} - \theta_{TX,l,i})$$

where:

$\phi_{TX,l,i}$ represents the azimuth of arrival of the of the $i^{th}$ ray in the $l^{th}$ delay bin;

$\theta_{TX,l,i}$ represents the elevation of arrival of the of the $i^{th}$ ray in the $l^{th}$ delay bin.

The case of I=1 describes the channel case I and I≠1 leads to cases II and III from FIG. 1. In vectorial notation, the channel matrix can be written as:

$$H = \begin{bmatrix} h_{1,1,1} & h_{1,2,1} & \cdots & h_{1,N_{UE},1} & h_{1,1,2} & h_{1,2,1} & \cdots & h_{1,N_{UE},2} & h_{1,1,2} & h_{1,2,1} & \cdots & h_{1,N_{UE},L} \\ h_{2,1,1} & h_{2,2,1} & \cdots & h_{2,N_{UE},1} & h_{2,1,2} & h_{2,2,1} & \cdots & h_{2,N_{UE},2} & h_{2,1,2} & h_{2,2,1} & \cdots & h_{2,N_{UE},L} \\ \vdots & \vdots & & \vdots & \vdots & \vdots & & \vdots & \vdots & \vdots & & \vdots \\ h_{N_{BS},1,1} & h_{N_{BS},1,2} & \cdots & h_{N_{BS},N_{UE},1} & h_{N_{BS},1,2} & h_{N_{BS},2,1} & \cdots & h_{N_{BS},N_{UE},2} & h_{N_{BS},1,2} & h_{N_{BS},2,1} & \cdots & h_{N_{BS},N_{UE},L} \\ \underbrace{\phantom{xxxxxxxxxxxxxxxxxxx}}_{l=1} & & & & \underbrace{\phantom{xxxxxxxxxxxxxxxxxxx}}_{l=2} & & & & \underbrace{\phantom{xxxxxxxxxxxxxxxxxxx}}_{l=L} & & & \end{bmatrix}$$

$$\in \mathbb{C}^{N_{BS} \times N_{UE} L}$$

Considering the case of a single antenna, $N_{UE}=1$, the channel matrix is reduced to:

$$H = \begin{bmatrix} h_{1,1} & h_{1,2} & & h_{1,L} \\ h_{2,1} & h_{2,2} & \cdots & h_{2,L} \\ \vdots & \vdots & & \vdots \\ h_{N_{BS},1} & h_{N_{BS},2} & & h_{N_{BS},L} \end{bmatrix} \in \mathbb{C}^{N_{BS} \times L}$$

In both cases, the columns of H are the sum of the different impinging waves with the delay l and steering vector $a(\theta, \phi)$:

$$h_l = \sum_{i=1}^{I} c_{l,i} e^{-i2\pi f_{L,i}^D t} a(\theta_i, \phi_i)$$

The steering vector $a(\theta, \phi)$ depends on the geometry and configuration of the arrays. The following equation is an example of steering vector for an M×N=$N_{BS}$ uniform rectangular array (URA) laying on the yz-plane:

$$a_y(\theta_i, \phi_i) = \begin{bmatrix} e^{-j\frac{2\pi}{\lambda}\sin(\theta_i)\sin(\phi_i)p_{0,y}} & \cdots & e^{-j\frac{2\pi}{\lambda}\sin(\theta_i)\sin(\phi_i)p_{M-1,y}} \end{bmatrix}$$

$$a_z(\theta_i, \phi_i) = \begin{bmatrix} e^{-j\frac{2\pi}{\lambda}\cos(\theta_i)p_{0,z}} & \cdots & e^{-j\frac{2\pi}{\lambda}\cos(\theta_i)p_{N-1,z}} \end{bmatrix}$$

$$a(\theta_i, \phi_i) = vec(a_z(\theta_i, \phi_i) a_y^T(\theta_i, \phi_i)) \text{ where}$$

$$p_{n,y} = \left(n - \frac{M-1}{2}\right) \text{ and } p_{n,z} = \left(n - \frac{N-1}{2}\right).$$

The following polarimetric description of the channel can be applied:
The channel impulse response of two co-located antennas with orthogonal polarizations (e.g. H and V) can be represented by means of the Jones calculus:

$$h = \begin{bmatrix} h_{n,t}^H \\ h_{n,t}^V \end{bmatrix} = \begin{bmatrix} \cos(\alpha) \\ \sin(\alpha)e^{j\beta} \end{bmatrix} \cdot h_n(t, \tau_l, \phi_{TX/RX}, \theta_{TX/RX})$$

where $\alpha$ is the orientation angle between the orthogonal components, and $\beta$ defines the ellipticity.
The polarimetric channel matrix can be rewritten as:

$$H = \begin{bmatrix} h_{1,1}^H & h_{1,2}^H & & h_{1,L}^H \\ h_{2,1}^H & h_{2,2}^H & \cdots & h_{2,L}^H \\ \vdots & \vdots & & \vdots \\ h_{N_{BS},1}^H & h_{N_{BS},2}^H & & h_{N_{BS},L}^H \\ h_{1,1}^V & h_{1,2}^V & & h_{1,L}^V \\ h_{2,1}^V & h_{2,2}^V & \cdots & h_{2,L}^V \\ \vdots & \vdots & & \vdots \\ h_{N_{BS},1}^V & h_{N_{BS},2}^V & & h_{N_{BS},L}^V \end{bmatrix} \in \mathbb{C}^{2N_{BS} \times L}$$

For the Up-link beamformer, the following applies:
The received signal can be written as the convolution of the multi-path channel with the transmitted signal. This can be calculated as the multiplication of the channel matrix H with the received signal arranged in a Toeplitz matrix S:

$$Y = HS + N \in \mathbb{C}^{2N_{BS} \times K+L} \text{ where}$$

$$S = \begin{bmatrix} s_1 & s_2 & s_3 & & 0 \\ 0 & s_1 & s_2 & & 0 \\ \vdots & \vdots & \vdots & \cdots & \vdots \\ 0 & 0 & 0 & & s_{K-1} \end{bmatrix},$$

K is the total amount of transmitted symbols, and $s_k \in \mathbb{C}$ is the transmitted symbol at the time instance k. The goal of the beam former $\omega_{UL} \in \mathbb{C}^{2N_{BS} \times L}$ is to isolate each $l^{th}$ path in the directional domain and then combine them after a time alignment. Each column of the $\omega_{UL}$ matrix is the set of coefficient of the structure A.
The output of the beam former $\hat{Y}$ is calculated as:

$$\hat{Y} = \omega_{UL}^H Y = \underbrace{\omega_{UL}^H H S}_{\hat{S}} + \underbrace{\omega_{UL}^H N}_{\hat{N}} \in \mathbb{C}^{L \times K+L}$$

In order to maximize the SNR, the maximum ratio combining (MRC) criteria might be applied in the weights of the beam former by fulfilling the following constraint $\omega_{UL}^H H = \text{diag}(g)_{L \times L}$ instead of $\omega_{UL}^H H = I_{L \times L}$. The elements of the gain vector $g \in \mathbb{C}^{L \times 1}$ are proportional to the attenuation of each delay tap and can be estimated as the diagonal elements of the following multiplication of the channel matrix:

$$g = \text{diag}\left(\frac{1}{\sqrt{N_{BS}}}(H^H H) \circ \frac{1}{2}\right) \in \mathbb{C}^{L \times L},$$

where the function diag extracts the elements of the main diagonal of the argument. The output of each structure A (input of the L demodulators) will be an estimation of the symbols plus the noise shaped by the filter:

$$\begin{bmatrix} \text{Demodulator}_1 \\ \text{Demodulator}_2 \\ \vdots \\ \text{Demodulator}_L \end{bmatrix} \leftarrow \begin{bmatrix} \hat{y}_{1,1} & \hat{y}_{1,k} & \hat{y}_{1,K+L} \\ \hat{y}_{1,1} & \cdots & \hat{y}_{1,k} & \cdots & \hat{y}_{1,K+L} \\ \vdots & \vdots & \vdots \\ \hat{y}_{L,1} & \hat{y}_{L,k} & \hat{y}_{L,K+L} \end{bmatrix} =$$

$$\begin{bmatrix} \hat{s}_1 + \hat{n}_{1,1} & \hat{s}_2 + \hat{n}_{1,2} & \hat{s}_3 + \hat{n}_{1,3} & & 0 \\ 0 & \hat{s}_1 + \hat{n}_{2,2} & \hat{s}_2 + \hat{n}_{2,3} & \cdots & 0 \\ \vdots & \vdots & \vdots & & \vdots \\ 0 & 0 & 0 & & \hat{s}_{K-L} + \hat{n}_{L,K-L} \end{bmatrix}$$

The summation of the diagonals can be performed in the digital domain by a shift register:

$$\tilde{s}_k = \sum_{l=1}^{L} \hat{Y}(k+l, k+l) \in \mathbb{C}^{1 \times K}$$

For the down-link beamformer, the following applies:
The received signal at the UE can be written as the convolution of the channel with the pre-coded signal from the BS. This can be calculated as the multiplication of the channel matrix $H \in \mathbb{C}^{N_{UE} \times N_{BS}L}$ with the beam formed TX signal X arranged in a Toeplitz matrix $X_T$. The symbols at the TX side are arranged in a special manner for the time reversal technique:

$$X = \omega_{DL}\hat{S} \in \mathbb{C}^{2N_{BS} \times K+L}$$

$$\hat{S} = \text{flipud}(S)$$

The rows of $\hat{S}$ are the output stream of the DAC. Each stream output is a delayed version of the original TX stream. The columns of $\omega_{DL} \in \mathbb{C}^{2N_{BS} \times L}$ are the coefficients of the structures A. The rows of X are the output of the antennas for the different time instances k.

Considering the example of $N_{UE}=1$, the channel matrix becomes a row vector $h \in \mathbb{C}^{1 \times 2N_{BS}L}$:

$$h = \left[ \underbrace{h_{11}^H h_{21}^H \ldots h_{N_{BS}1}^H h_{11}^V h_{21}^V \ldots h_{N_{BS}1}^V}_{l=1} \middle| \underbrace{h_{12}^H h_{22}^H \ldots h_{N_{BS}2}^H h_{12}^V h_{22}^V \ldots h_{N_{BS}2}^V}_{l=2} \middle| \ldots \middle| \underbrace{h_{1L}^H h_{2L}^H \ldots h_{N_{BS}L}^H h_{1L}^V h_{2L}^V \ldots h_{N_{BS}L}^V}_{l=L} \right]$$

The received signal can be represented as:

$$y = hX_T + n \in \mathbb{C}^{1 \times K+L}$$

The goal of the beam former is to orthogonalize the different delayed version of beams so they don't interfere to each other. By rewriting the channel as a matrix with the different delays stacked in rows, the beam former coefficients can be calculated in such a way that the MRC constrain $H\omega_{DL} = \text{diag}(g)$ is also fulfilled:

$$H\omega_{DL} = \text{diag}(g) \rightarrow \begin{bmatrix} \underbrace{h_{11}^H h_{21}^H \ldots h_{N_{BS}1}^H h_{11}^V h_{21}^V \ldots h_{N_{BS}1}^V}_{l=1} \\ \underbrace{h_{12}^H h_{22}^H \ldots h_{N_{BS}2}^H h_{12}^V h_{22}^V \ldots h_{N_{BS}2}^V}_{l=2} \\ \vdots \\ \underbrace{h_{1L}^H h_{2L}^H \ldots h_{N_{BS}L}^H h_{1L}^V h_{2L}^V \ldots h_{N_{BS}L}^V}_{l=L} \end{bmatrix}$$

$$\begin{bmatrix} \omega_{1,1}^H & \omega_{1,2}^H & & \omega_{1,L}^H \\ \omega_{2,1}^H & \omega_{2,2}^H & & \omega_{2,L}^H \\ \vdots & \vdots & \ldots & \vdots \\ \omega_{N_{BS},1}^H & \omega_{N_{BS},2}^H & & \omega_{N_{BS},L}^H \\ \omega_{1,1}^V & \omega_{1,2}^V & & \omega_{1,L}^V \\ \omega_{2,1}^V & \omega_{2,2}^V & & \omega_{2,L}^V \\ \vdots & \vdots & \ldots & \vdots \\ \omega_{N_{BS},1}^V & \omega_{N_{BS},2}^V & & \omega_{N_{BS},L}^V \end{bmatrix} = \begin{bmatrix} g_1 & \ldots & 0 \\ \vdots & \ddots & \vdots \\ 0 & \ldots & g_L \end{bmatrix}$$

The present disclosure also supports a method for analog beamforming transmission, comprising the following steps: receiving an analog complex-valued communication signal having an in-phase and a quadrature component; providing a dual-polarized antenna signal having a first polarization component and a second polarization component; receiving a first analog complex-valued beamforming coefficient of a set of first analog complex-valued beamforming coefficients; receiving a second analog complex-valued beamforming coefficient of a set of second analog complex-valued beamforming coefficients; multiplying the analog complex-valued communication signal with the first analog complex-valued beamforming coefficient to provide the first polarization component of the dual-polarized antenna signal; and multiplying the analog complex-valued communication signal with the second analog complex-valued beamforming coefficient to provide the second polarization component of the dual-polarized antenna signal.

The present disclosure also supports a method for analog beamforming reception, comprising the following steps: receiving a dual-polarized antenna signal having a first polarization component and a second polarization component; providing an analog complex-valued communication signal having an in-phase and a quadrature component; receiving a first analog complex-valued beamforming coefficient of a set of first analog complex-valued beamforming coefficients; receiving a second analog complex-valued beamforming coefficient of a set of second analog complex-valued beamforming coefficients; multiplying the first polarization component of the dual polarized antenna signal with the first analog complex-valued beamforming coefficient to provide a first contribution to the analog complex-valued communication signal; and multiplying the second polarization component of the dual polarized antenna signal with the second analog complex-valued beamforming coefficient to provide a second contribution to the analog complex-valued communication signal.

The present disclosure also supports a computer program product including computer executable code or computer executable instructions that, when executed, causes at least one computer to execute the methods describe above or the performing and computing steps described herein, in particular the techniques for beamforming as described above. Such a computer program product may include a readable storage medium storing program code thereon for use by a computer. The program code may perform the methods as described above or the techniques for beamforming as described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

Additionally, statements made herein characterizing the invention refer to an embodiment of the invention and not necessarily all embodiments.

What is claimed is:

1. An analog polarization adjustment transmitter, comprising:
   a plurality of polarization adjustment transmission circuits coupled in parallel between a signal input and an array of antenna ports;
   wherein the signal input is configured to receive an analog complex-valued communication signal having an in-phase component and a quadrature component;
   wherein each antenna port of the array of antenna ports is configured to provide a dual-polarized antenna signal having a first polarization component and a second polarization component;
   wherein each polarization adjustment transmission circuit is coupled between the signal input and a respective antenna port of the array of antenna ports;
   wherein each polarization adjustment transmission circuit comprises a first coefficient input for receiving a first analog real-valued polarization adjustment coefficient of a set of first analog real-valued polarization adjustment coefficients and a second coefficient input for receiving a second analog real-valued polarization adjustment coefficient of a set of second analog real-valued polarization adjustment coefficients; and
   wherein each polarization adjustment transmission circuit comprises:
      a first analog multiplication circuit configured to multiply the analog complex-valued communication signal with a respective first analog real-valued polarization adjustment coefficient to provide a respective first polarization component of the dual-polarized antenna signal at a respective antenna port of the array of antenna ports;
      a second analog multiplication circuit configured to multiply the analog complex-valued communication signal with a respective second analog real-valued polarization adjustment coefficient to provide a respective second polarization component of the dual-polarized antenna signal at a respective antenna port of the array of antenna ports;
      a third coefficient input for receiving an analog complex-valued beamforming coefficient of a set of analog complex-valued beamforming coefficients; and
      an analog complex-valued multiplication circuit coupled between the signal input and a respective one of the first and second analog multiplication circuits, wherein the analog complex-valued multiplication circuit is configured to multiply the analog complex-valued communication signal with the analog complex-valued beamforming coefficient to provide a beamformed analog complex-valued communication signal to the first and second analog multiplication circuits.

2. The analog polarization adjustment transmitter of claim 1, further comprising:
   a modulation circuit configured to modulate the analog complex-valued beamforming coefficient based on a Doppler shift corresponding to a beam formed by the analog complex-valued beamforming coefficient.

3. The analog polarization adjustment transmitter of claim 2, wherein the modulation circuit is configured to modulate the analog complex-valued beamforming coefficient to a frequency that has a negated value of the Doppler shift corresponding to a concerned beam.

4. The analog polarization adjustment transmitter of claim 1, wherein each polarization adjustment transmission circuit further comprises:
   a mixer configured to mix the analog complex-valued communication signal with a Doppler shift compensation frequency to provide a Doppler shift compensated analog complex-valued communication signal.

5. The analog polarization adjustment transmitter of claim 4, further comprising:
   one of a multiplication circuitry or a delay line coupled between the mixer and the first and second analog multiplication circuits.

6. The analog polarization adjustment transmitter of claim 1, wherein each polarization adjustment transmission circuit further comprises:
   a delay line configured to delay the analog complex-valued communication signal with a time delay to provide a delay compensated analog complex-valued communication signal.

7. The analog polarization adjustment transmitter of claim 6, further comprising:
   a multiplication circuit, coupled between the delay line and the first and second analog multiplication circuits, configured to provide a beamforming operation or a Doppler shift compensation.

8. The analog polarization adjustment transmitter of claim 1, wherein the first and second analog multiplication circuits comprise at least one Gilbert cell.

9. The analog polarization adjustment transmitter of claim 8, wherein the at least one Gilbert cell comprises a real multiplication Gilbert cell that performs real valued multiplication operation.

10. The analog polarization adjustment transmitter of claim 1, wherein the first coefficient input and the second coefficient input are coupled to a digital-to-analog converter or a shift-register circuit providing the first and second analog real-valued polarization adjustment coefficients.

11. The analog polarization adjustment transmitter of claim 1, further comprising:
   a signal combiner configured to combine the first polarization component of the dual-polarized antenna signal and a first polarization component of the dual-polarized antenna signal provided by a further analog polarization adjustment transmitter to provide a combined first polarization component of the dual-polarized antenna signal at the respective antenna port of the array of antenna ports.

12. An analog polarization adjustment receiver, comprising:
- a plurality of polarization adjustment reception circuits connected in parallel between an array of antenna ports and a signal output;
- wherein each antenna port of the array of antenna ports is configured to receive a dual-polarized antenna signal having a first polarization component and a second polarization component;
- wherein the signal output is configured to provide an analog complex-valued communication signal having an in-phase component and a quadrature component;
- wherein each polarization adjustment reception circuit is connected between a respective antenna port of the array of antenna ports and the signal output;
- wherein each polarization adjustment reception circuit comprises a first coefficient input for receiving a first analog real-valued polarization adjustment coefficient of a set of first analog real-valued polarization adjustment coefficients and a second coefficient input for receiving a second analog real-valued polarization adjustment coefficient of a set of second analog real-valued polarization adjustment coefficients; and
- wherein each polarization adjustment reception circuit comprises:
  - a first analog multiplication circuit configured to multiply a respective first polarization component of the dual polarized antenna signal at a respective antenna port of the array of antenna ports with a respective first analog real-valued polarization adjustment coefficient to provide a contribution to the analog complex-valued communication signal at the signal output;
  - a second analog multiplication circuit configured to multiply a respective second polarization component of the dual polarized antenna signal at a respective antenna port of the array of antenna ports with a respective second analog real-valued polarization adjustment coefficient to provide a contribution to the analog complex-valued communication signal at the signal output;
  - a third coefficient input for receiving an analog complex-valued beamforming coefficient of a set of analog complex-valued beamforming coefficients; and
  - an analog complex-valued multiplication circuit coupled between a respective one of the first and second analog multiplication circuits and the signal output, wherein the analog complex-valued multiplication circuit is configured to multiply an output signal of an adder with the analog complex-valued beamforming coefficient to provide a beamformed analog complex-valued communication signal at the signal output.

13. The analog polarization adjustment receiver of claim 12,
- wherein the adder is configured to add the contributions to the analog complex-valued communication signal provided by the first and the second analog multiplication circuits.

14. The analog polarization adjustment receiver of claim 12, further comprising:
- a modulation circuit configured to modulate the analog complex-valued beamforming coefficient based on a Doppler shift corresponding to a beam formed by the analog complex-valued beamforming coefficient.

15. The analog polarization adjustment receiver of claim 14, wherein the modulation circuit is configured to modulate the analog complex-valued beamforming coefficient to a frequency that has a negated value of the Doppler shift corresponding to a concerned beam.

16. The analog polarization adjustment receiver of claim 12, wherein each polarization adjustment reception circuit further comprises:
- a mixer configured to mix the contributions or a sum of such contributions to the analog complex-valued communication signal provided by the first and second analog multiplication circuits with a Doppler shift compensation frequency to provide a Doppler shift compensated contribution to the analog complex-valued communication signal at the signal output.

17. The analog polarization adjustment receiver of claim 12, wherein each polarization adjustment reception circuit comprises:
- a delay line configured to delay the contribution to the analog complex-valued communication signal at the signal output with a time delay to provide a delay compensated contribution to the analog complex-valued communication signal at the signal output.

18. The analog polarization adjustment receiver of claim 12, wherein the first and second analog multiplication circuits comprise at least one Gilbert cell.

19. The analog polarization adjustment receiver of claim 18, wherein the at least one Gilbert cell comprises a real multiplication Gilbert cell that performs real valued multiplication operation.

20. The analog polarization adjustment receiver of claim 12, wherein the first coefficient input and the second coefficient input are coupled to a digital-to-analog converter or a shift-register circuit providing the first and second analog real-valued polarization adjustment coefficients.

21. The analog beamforming receiver of claim 20, wherein the signal output is coupled to an analog-to-digital converter to provide a digital complex-valued communication signal, wherein a sampling rate of the analog-to-digital converter is greater than a sampling rate of the digital-to-analog converter that is used for converting coefficients.

22. An analog polarization adjustment transmitter, comprising:
- a plurality of polarization adjustment transmission circuits coupled in parallel between a signal input and an array of antenna ports;
- wherein the signal input is configured to receive an analog complex-valued communication signal having an in-phase component and a quadrature component;
- wherein each antenna port of the array of antenna ports is configured to provide a dual-polarized antenna signal having a first polarization component and a second polarization component;
- wherein each polarization adjustment transmission circuit is coupled between the signal input and a respective antenna port of the array of antenna ports;
- wherein each polarization adjustment transmission circuit comprises a first coefficient input for receiving a first analog real-valued polarization adjustment coefficient of a set of first analog real-valued polarization adjustment coefficients and a second coefficient input for receiving a second analog real-valued polarization adjustment coefficient of a set of second analog real-valued polarization adjustment coefficients;
- wherein each polarization adjustment transmission circuit comprises:

a first analog multiplication circuit configured to multiply the analog complex-valued communication signal with a respective first analog real-valued polarization adjustment coefficient to provide a respective first polarization component of the dual-polarized antenna signal at a respective antenna port of the array of antenna ports; and a second analog multiplication circuit configured to multiply the analog complex-valued communication signal with a respective second analog real-valued polarization adjustment coefficient to provide a respective second polarization component of the dual-polarized antenna signal at a respective antenna port of the array of antenna ports; and wherein the analog polarization adjustment transmitter further comprises: a signal combiner configured to combine the first polarization component of the dual-polarized antenna signal and a first polarization component of the dual-polarized antenna signal provided by a further analog polarization adjustment transmitter to provide a combined first polarization component of the dual-polarized antenna signal at the respective antenna port of the array of antenna ports.

* * * * *